(12) United States Patent
Qu et al.

(10) Patent No.: US 11,333,547 B2
(45) Date of Patent: May 17, 2022

(54) METHOD AND SYSTEM FOR SHIPPING CONTAINER LOADING AND UNLOADING ESTIMATION

(71) Applicant: BlackBerry Limited, Waterloo (CA)

(72) Inventors: Shouxing Qu, Gloucester (CA); Gaëlle Christine Martin-Cocher, Toronto (CA); Suresh Periyalwar, Toronto (CA); Yu Gao, Waterloo (CA); Sameh Ayoub, Ottawa (CA)

(73) Assignee: BlackBerry Limited, Waterloo (CA)

( * ) Notice: Subject to any disclaimer, the term of this patent is extended or adjusted under 35 U.S.C. 154(b) by 93 days.

(21) Appl. No.: 16/664,387

(22) Filed: Oct. 25, 2019

(65) Prior Publication Data

US 2021/0123795 A1   Apr. 29, 2021

(51) Int. Cl.
*G01H 1/00* (2006.01)
*G06N 20/00* (2019.01)

(52) U.S. Cl.
CPC .............. *G01H 1/00* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,877,455 A | * | 3/1999 | Kyrtsos | G01G 19/12 177/1 |
| 5,973,273 A | * | 10/1999 | Tai | G01G 19/08 177/1 |
| 8,483,942 B2 | | 7/2013 | Watanabe | |
| 8,958,940 B2 | | 2/2015 | Kawasaki | |
| 2006/0041403 A1 | * | 2/2006 | Jaber | G06F 17/18 702/189 |
| 2006/0293815 A1 | * | 12/2006 | McCann | B60G 17/01908 701/37 |
| 2016/0072649 A1 | * | 3/2016 | Tu | G05B 13/027 375/346 |

(Continued)

FOREIGN PATENT DOCUMENTS

GB       2570558 A       7/2019

OTHER PUBLICATIONS

Extended European Search Report, EP Application No. 20201181.3, dated Mar. 24, 2021.

(Continued)

*Primary Examiner* — Kyle R Quigley
*Assistant Examiner* — Denise R Karavias
(74) *Attorney, Agent, or Firm* — Moffat & Co

(57) ABSTRACT

A method at a computing device, the method including obtaining sensor data for a vehicle providing vibration frequency and magnitude; calculating an energy for each of a low frequency passband and a high frequency passband of a bandpass filter pair; finding an energy ratio based on the energy for the low frequency passband and the energy for the high frequency passband; applying weighting constants to each of the energy for the low frequency passband, the energy for the high frequency passband and the energy ratio to calculate a decision variable; and finding that the vehicle is unloaded if the decision variable is below a threshold and finding that the vehicle is loaded if the decision variable is above a threshold.

17 Claims, 18 Drawing Sheets

(56) References Cited

U.S. PATENT DOCUMENTS

| | | | | |
|---|---|---|---|---|
| 2016/0114809 A1* | 4/2016 | Savaresi | ............... | B60W 40/13 |
| | | | | 702/41 |
| 2017/0372229 A1* | 12/2017 | Ura | ........................ | G06N 20/00 |
| 2018/0094966 A1* | 4/2018 | Buether | ............... | B62D 53/068 |
| 2018/0114381 A1* | 4/2018 | Hiemer | ................ | G07C 5/0808 |
| 2018/0186208 A1* | 7/2018 | Coombs | ............... | B60G 17/052 |
| 2018/0361994 A1 | 12/2018 | Seaman | | |

OTHER PUBLICATIONS

John C Platt, Sequential Minimal Optimization: A Fast Algorithm for Training Support Vector Machines, Technical Report MSR-TR-98-14, Apr. 21, 1998.

Stanford University, CS 229 The Simplified SMO Algorithm, Autumn 2009.

European Office Action, EP Application No. 20201181.3, dated Mar. 17, 2022.

\* cited by examiner

METHOD AND SYSTEM FOR SHIPPING CONTAINER LOADING AND UNLOADING ESTIMATION

FIELD OF THE DISCLOSURE

The present disclosure relates to the transportation of goods, and in particular relates to load detection for vehicles or for containers on a trailer chasses.

BACKGROUND

During the transportation of goods, determining whether a trailer is loaded is an important aspect of trailer asset management. With the transportation of shipping containers using tractor trailers, it is important to understand whether a trailer, referred to herein as a chassis, is loaded or not.

The information on vehicle loading may be beneficial to the transportation company. In particular, a transportation company managing a fleet of vehicles needs to know which vehicles are loaded and which vehicles are empty.

Typically, vehicle loading is determined by manual inspection, which is a cumbersome process that can be slow and inaccurate.

BRIEF DESCRIPTION OF THE DRAWINGS

The present disclosure will be better understood with reference to the drawings, in which:

FIG. 16B is a plot showing a histogram of the distribution of decision variables based on SVM using multiple bandpass filter pairs.

DETAILED DESCRIPTION OF THE DRAWINGS

The present disclosure provides a method at a computing device, the method comprising: obtaining sensor data for a vehicle providing vibration frequency and magnitude; calculating an energy for each of a low frequency passband and a high frequency passband of a bandpass filter pair; finding an energy ratio based on the energy for the low frequency passband and the energy for the high frequency passband; applying weighting constants to each of the energy for the low frequency passband, the energy for the high frequency passband and the energy ratio to calculate a decision variable; and finding that the vehicle is unloaded if the decision variable is below a threshold and finding that the vehicle is loaded if the decision variable is above a threshold.

The present disclosure further provides a computing device comprising: a processor; and a communications subsystem, wherein the computing device is configured to: obtain sensor data for a vehicle providing vibration frequency and magnitude; calculate an energy for each of a low frequency passband and a high frequency passband of a bandpass filter pair; find an energy ratio based on the energy for the low frequency passband and the energy for the high frequency passband; apply weighting constants to each of the energy for the low frequency passband, the energy for the high frequency passband and the energy ratio to calculate a decision variable; and find that the vehicle is unloaded if the decision variable is below a threshold and finding that the vehicle is loaded if the decision variable is above a threshold.

The present disclosure further provides a computer readable medium for storing instruction code, which, when executed by a processor on a computing device cause the computing device to: obtain sensor data for a vehicle providing vibration frequency and magnitude; calculate an energy for each of a low frequency passband and a high frequency passband of a bandpass filter pair; find an energy ratio based on the energy for the low frequency passband and the energy for the high frequency passband; apply weighting constants to each of the energy for the low frequency passband, the energy for the high frequency passband and the energy ratio to calculate a decision variable; and find that the vehicle is unloaded if the decision variable is below a threshold and finding that the vehicle is loaded if the decision variable is above a threshold.

In accordance with the embodiments described below, cargo load detection systems utilizing a vertical accelerometer and/or strain gauges are described.

In the embodiments described below, the load detection is performed on a trailer chassis which is connected to a tractor. However, in other cases, the measurements may be made on other shipping containers, including, but not limited to, railcars, trucks, automobiles, among others.

Figure 1:
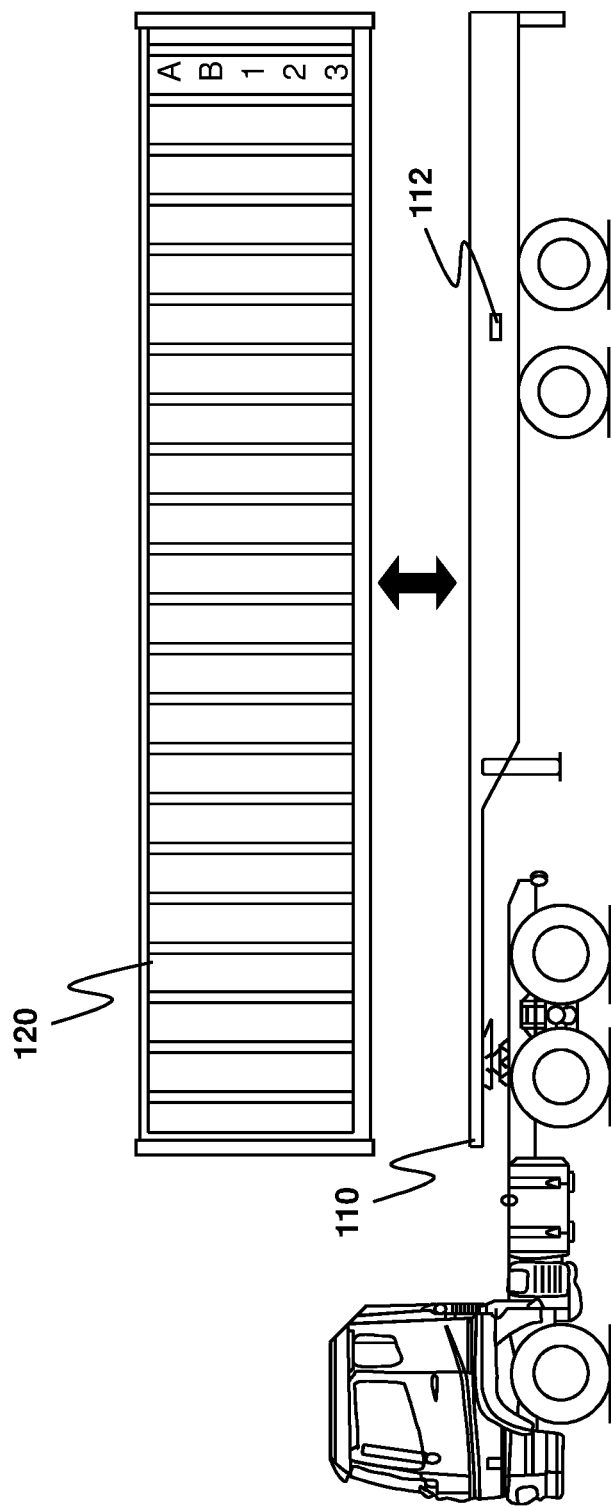
FIG. 1 is a side elevational view of a trailer chassis adapted to receive shipping containers, the figure showing an example placement of a sensor apparatus.

In order to perform load detection, a sensor apparatus may be affixed to a container, trailer, or other similar asset. Such sensor apparatus may, for example, be mounted inside of a chassis of a flatbed trailer configured to receive shipping containers. Reference is now made to FIG. 1.

In the embodiment of FIG. 1, example truck trailer 110 is shown. In one embodiment, the computing device may be mounted within the chassis of the trailer. For example, in one embodiment the computing device may be mounted above the rear wheels of the truck trailer 110. This is shown, for example, with sensor apparatus 112 in the embodiment of FIG. 1.

However, in other cases it may be beneficial to have a different position for the sensor apparatus. Further, in some embodiments it may be useful to have a plurality of such sensor apparatuses within the trailer 110.

The sensor apparatuses within trailer 110 may be used alone in some embodiments, or may be combined into sets of two or more sensor apparatuses and/or external sensors for load determination calculations.

In the embodiment of FIG. 1, trailer 110 is adapted to secure and carry a shipping container 120 thereon. Information on whether the shipping container 120 is present or not would be useful to a transportation company.

Apparatus

Figure 2:
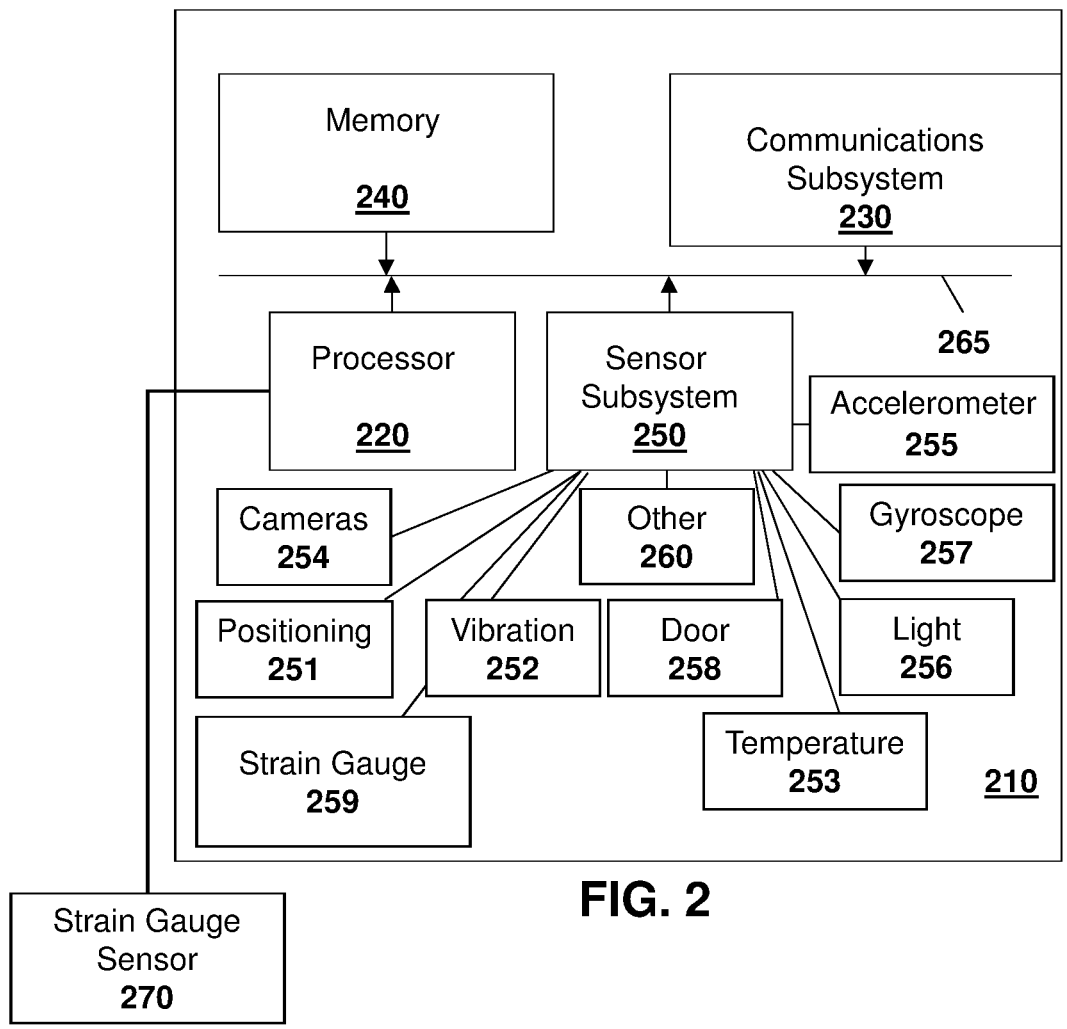
FIG. 2 is block diagram of an example sensor apparatus capable of being used for embodiments of the present disclosure.

One sensor apparatus for a vehicle, chassis, trailer, container, or other transportation asset is shown with regard to FIG. 2. The sensor apparatus of FIG. 2 is however merely an example and other sensing devices could equally be used in accordance with the embodiments of the present disclosure.

Reference is now made to FIG. 2, which shows an example sensor apparatus 210. Sensor apparatus 210 can be any computing device or network node. Such sensor apparatus or network node may include any type of electronic device, including but not limited to, mobile devices such as smartphones or cellular telephones. Examples can further include fixed or mobile devices, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 210 comprises a processor 220 and at least one communications subsystem 230, where the processor 220 and communications subsystem 230 cooperate to perform the methods of the embodiments described herein. Communications subsystem 230 may, in some embodiments, comprise multiple subsystems, for example for different radio technologies.

Communications subsystem 230 allows sensor apparatus 210 to communicate with other devices or network elements. Communications subsystem 230 may use one or more of a variety of communications types, including but not limited to cellular, satellite, Bluetooth™, Bluetooth™ Low Energy, Wi-Fi, wireless local area network (WLAN), sub-giga hertz radios, near field communications (NFC), IEEE 802.15, wired connections such as Ethernet or fiber, among other options.

As such, a communications subsystem 230 for wireless communications will typically have one or more receivers and transmitters, as well as associated components such as one or more antenna elements, local oscillators (LOs), and may include a processing module such as a digital signal processor (DSP) or System on Chip (SOC). As will be apparent to those skilled in the field of communications, the particular design of the communication subsystem 230 will be dependent upon the communication network or communication technology on which the sensor apparatus is intended to operate.

Processor 220 generally controls the overall operation of the sensor apparatus 210 and is configured to execute programmable logic, which may be stored, along with data, using memory 240. Memory 240 can be any tangible, non-transitory computer readable storage medium, including DRAM, Flash, optical (e.g., CD, DVD, etc.), magnetic (e.g., tape), flash drive, hard drive, or other memory known in the art.

Alternatively, or in addition to memory 240, sensor apparatus 210 may access data or programmable logic from an external storage medium (not shown), for example through communications subsystem 230.

In the embodiment of FIG. 2, sensor apparatus 210 may utilize a plurality of sensors, which may either be part of sensor apparatus 210 in some embodiments or may communicate with sensor apparatus 210 in other embodiments. For internal sensors, processor 220 may receive input from a sensor subsystem 250.

Examples of sensors in the embodiment of FIG. 2 include a positioning sensor 251, a vibration sensor 252, a temperature sensor 253, one or more image sensors/cameras 254, accelerometer 255, light sensors 256, gyroscopic sensors 257, a door sensor 258, a strain gauge 259, and other sensors 260. Other sensors may be any sensor that is capable of reading or obtaining data that may be useful for the sensor apparatus 210. However, the sensors shown in the embodiment of FIG. 2 are merely examples, and in other embodiments, different sensors or a subset of sensors shown in FIG. 2 may be used. For example, in some cases the only sensor may be an accelerometer or a strain gauge.

Further, accelerometer 255 would typically provide acceleration sensors in three dimensions. Thus, accelerometer 255 would generally include three individual accelerometers. The readings from each of the three individual accelerometers could be isolated.

Communications between the various elements of sensor apparatus 210 may be through an internal bus 265 in one embodiment. However, other forms of communication are possible.

In the embodiment of FIG. 2, rather than an internal strain gauge sensor 259, in some cases the strain gauge sensor may be external to the sensor apparatus and may be controlled by sensor apparatus 210. Strain gauge sensor 270 may, for example, be mounted together with sensor apparatus 210 or may form part of sensor apparatus 210. A single or multiple strain gauge sensors can be mounted on the longitudinal frame of the chassis to detect displacement when a container is loaded on the chassis. The strain gauge sensor may, in some embodiments, consist of a microprocessor, a strain gauge, a battery, and a short-range technology radio transmitter (Bluetooth, IEEE 802.15.4, or Wi-Fi). The sensor 270 could be configured to measure vertical displacement, or both vertical and horizontal displacement relative to the chassis.

The sensor apparatus 210 may communicate with the strain gauge sensor 270 or strain gauge 259 to query the strain gauge reading under a trigger condition. Examples of trigger conditions could be: on a regular wake-up schedule negotiated between the sensor(s) and the sensor apparatus unit; when the trailer is in motion; and/or when the trailer stops, among other options.

A strain gauge will typically be displaced when the container is loaded and could be calibrated to estimate the relative or absolute weight of the container.

Sensor apparatus 210 may be affixed to any fixed or portable platform. For example, sensor apparatus 210 may be affixed to shipping containers or truck trailers in one embodiment. In other embodiments, sensor apparatus 210 may be affixed to a chassis of a trailer, as for example shown in FIG. 1. In other cases, the sensor apparatus 210 may be affixed to any transportation asset for which load detection is needed, including self-propelled vehicles (e.g., automobiles, cars, trucks, buses, etc.), railed vehicles (e.g., trains and trams, etc.), and other types of vehicles including any combinations of any of the foregoing, whether currently existing or after arising, among others.

In other cases, sensor apparatus 210 may be part of a container that could be carried on or within a vehicle, for example container 120 from FIG. 1. In accordance with the present disclosure, the term container may include any sort of cargo or item transportation such as vehicles, intermodal containers, shipping bins, lock boxes, and other similar vessels.

Such a sensor apparatus 210 may be a power limited device. For example, sensor apparatus 210 could be a battery-operated device that can be affixed to a shipping container or trailer in some embodiments. Other limited power sources could include any limited power supply, such as a small generator or dynamo, a fuel cell, solar power, energy harvesting, among other options.

In other embodiments, sensor apparatus 210 may utilize external power, for example from the battery or power system of a tractor pulling the trailer, via a wiring harness connected to a 7-pin plug, from a land power source for example on a plugged-in recreational vehicle or from a building power supply, among other options. Thus, the sensor apparatus 210 may also be connected to a power cord that receives its power from a power source.

External power may further allow for recharging of batteries to allow the sensor apparatus 210 to then operate in a power limited mode again. Recharging methods may also include other power sources, such as, but not limited to, solar, electromagnetic, acoustic or vibration charging.

The sensor apparatus from FIG. 2 may be used in a variety of environments. One example environment in which the sensor apparatus may be used is shown with regard to FIG. 3.

Figure 3:
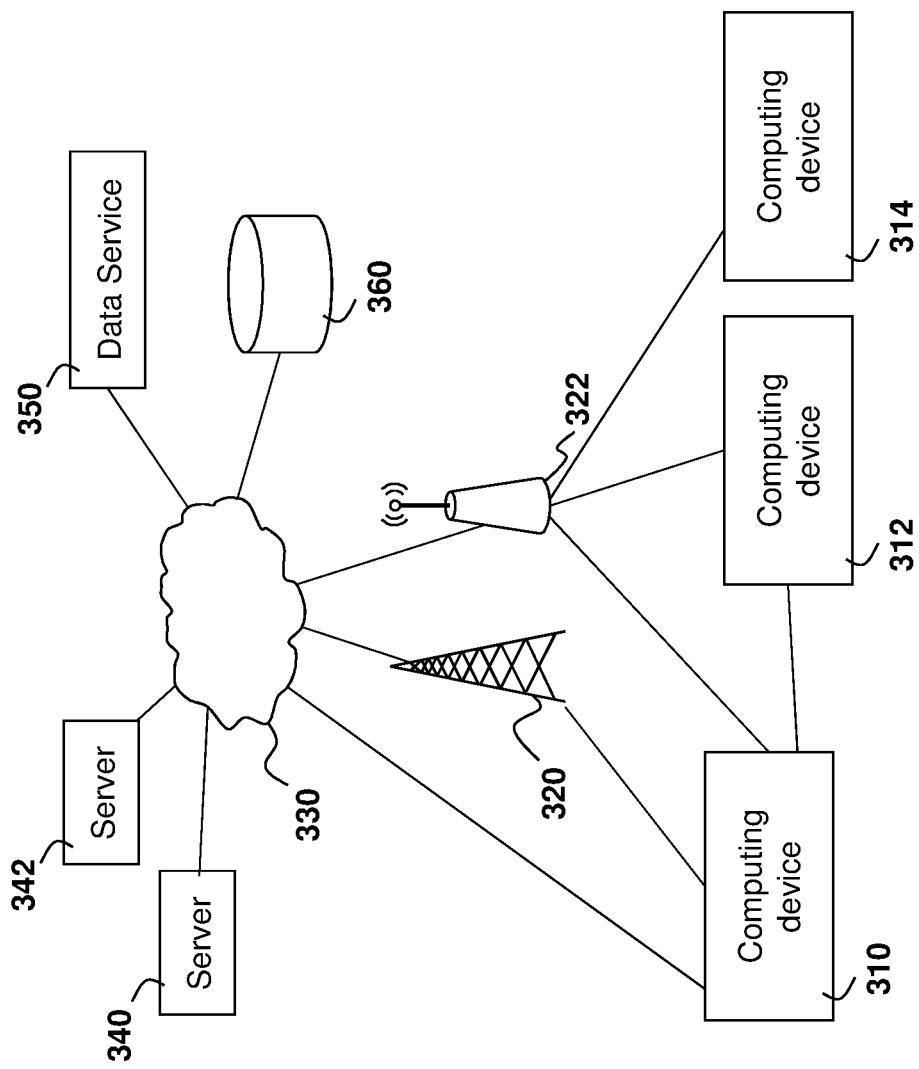
FIG. 3 is a block diagram showing an example architecture for the sensor apparatus of FIG. 2.

Referring to FIG. 3, three sensor apparatuses, namely sensor apparatus 310, sensor apparatus 312, and sensor apparatus 314 are provided.

In the example of FIG. 3, sensor apparatus 310 may communicate through a cellular base station 320 or through an access point 322. Access point 322 may be any wireless communication access point.

Further, in some embodiments, sensor apparatus 310 could communicate through a wired access point such as Ethernet or fiber, among other options.

The communication may then proceed over a wide area network such as Internet 330 and proceed to servers 340 or 342.

Similarly, sensor apparatus 312 and sensor apparatus 314 may communicate with server 340 or server 342 through one or both of the base station 320 or access point 322, among other options for such communication.

In other embodiments, any one of sensor apparatuses 310, 312 or 314 may communicate through satellite communication technology. This, for example, may be useful if the sensor apparatus is travelling to areas that are outside of cellular coverage or access point coverage.

In other embodiments, sensor apparatus 312 may be out of range of access point 322, and may communicate with sensor apparatus 310 to allow sensor apparatus 310 to act as a relay for communications.

Communication between sensor apparatus 310 and server 340 may be one directional or bidirectional. Thus, in one embodiment sensor apparatus 310 may provide information to server 340 but server 340 does not respond. In other cases, server 340 may issue commands to sensor apparatus 310 but data may be stored internally on sensor apparatus 310 until the sensor apparatus arrives at a particular location, possibly during a particular time window. In other cases, two-way communication may exist between sensor apparatus 310 and server 340.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of sensor apparatuses 310, 312, 314, etc. For example, the server may be located essentially anywhere so long as it has network access to communicate with sensor apparatuses 310, 312, 314, etc.

Server 340 may, for example, be a fleet management centralized monitoring station. In this case, server 340 may receive information from a sensor apparatus associated with various trailers or cargo containers, providing information such as the location of such cargo containers, the temperature within such cargo containers, any unusual events including sudden decelerations, temperature warnings when the temperature is either too high or too low, cargo loading status for the trailer, the mass of the trailer, among other data. The server 340 may compile such information and store it for future reference.

Other examples of functionality for server 340 are possible.

In the embodiment of FIG. 3, servers 340 and 342 may further have access to third-party information or information from other servers within the network. For example, a data services provider 350 may provide information to server 340. Similarly, a data repository or database 360 may also provide information to server 340.

For example, data services provider 350 may be a subscription-based service used by server 340 to obtain current road and weather conditions, or may be an inventory control system in some cases.

Data repository or database 360 may for example provide information such as image data associated with a particular location, aerial maps, detailed street maps, or other such information.

The types of information provided by data service provider 350 or the data repository or database 360 is not limited to the above examples and the information provided could be any data useful to server 340.

In some embodiments, information from data service provider 350 or the data repository from database 360 can be provided to one or more of sensor apparatuses 310, 312, or 314 for processing at those sensor apparatuses.

A sensor apparatus such as that described in FIGS. 2 and 3 above may be used to detect trailer loading of a container or trailer.

Calculating Trailer Loading

In accordance with some embodiments of the present disclosure, the rear segment of a transportation vehicle or trailer can be modelled as a simple spring with a mass "m" representing the mass of the container and the mass of the chassis, and a spring constant "k", where k is the stiffness of the structure and suspension. Further, a damper which may be dependent on the suspension of the chassis is represented with a damping constant "c". For example, reference is now made to FIG. 4.

Figure 4:
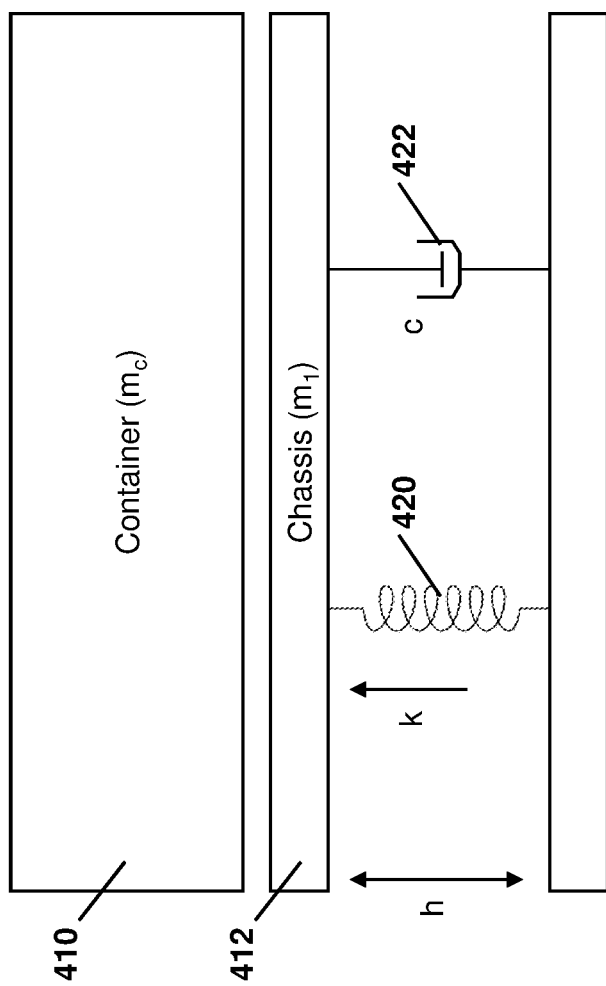
FIG. 4 is a block diagram showing a container and chassis acting on a spring and damper.

In the embodiment of FIG. 4, a container 410 has a mass "$m_c$". A chassis 412 has a mass "$m_1$". In the present disclosure, a mass "m" is the combination of masses $m_1$ and $m_c$.

A spring 420 is shown having a spring constant "k", which is representative of the stiffness of the structure and suspension.

Further, the damping constant "c" is shown using a representation 422 of the suspension.

A displacement "h" shows the amount of motion of the chassis from the rest position of the chassis towards the ground, for example when a bump is encountered by the chassis while the vehicle is operating.

The equation describing the motion of the chassis in one-dimension, using a single spring-damper, can be expressed as provided in equation 1 below:

$$m\frac{d^2h}{dt^2} = -kh - c\frac{dh}{dt} \quad (1)$$

In equation 1, m is the mass of the system, h is the displacement of the chassis from a rest position, t is time, k is the spring constant and c is the damping constant.

Solving equation 1 for the frequency of vibration yields equation 2:

$$f = \frac{1}{2\pi}\sqrt{\frac{k}{m}\left(1 - \frac{c^2}{4mk}\right)} = \frac{1}{4\pi m}\sqrt{4mk - c^2} \quad (2)$$

Based on equation 2, the frequency of vibration is inversely proportional to the mass applied to the trailer. When the trailer is under the same moving conditions, the vibration frequency of the trailer will shift lower when a shipping container is loaded on the chassis.

If a truck, trailer or other similar asset is loaded within safe operating limits, the springs on the axles should not experience any significant deformations, which may affect the frequency of vibration.

The amplitude of the oscillations depends on the forces of any impacts between the wheels in the ground, but do not affect the frequency of vibration.

Figure 5:
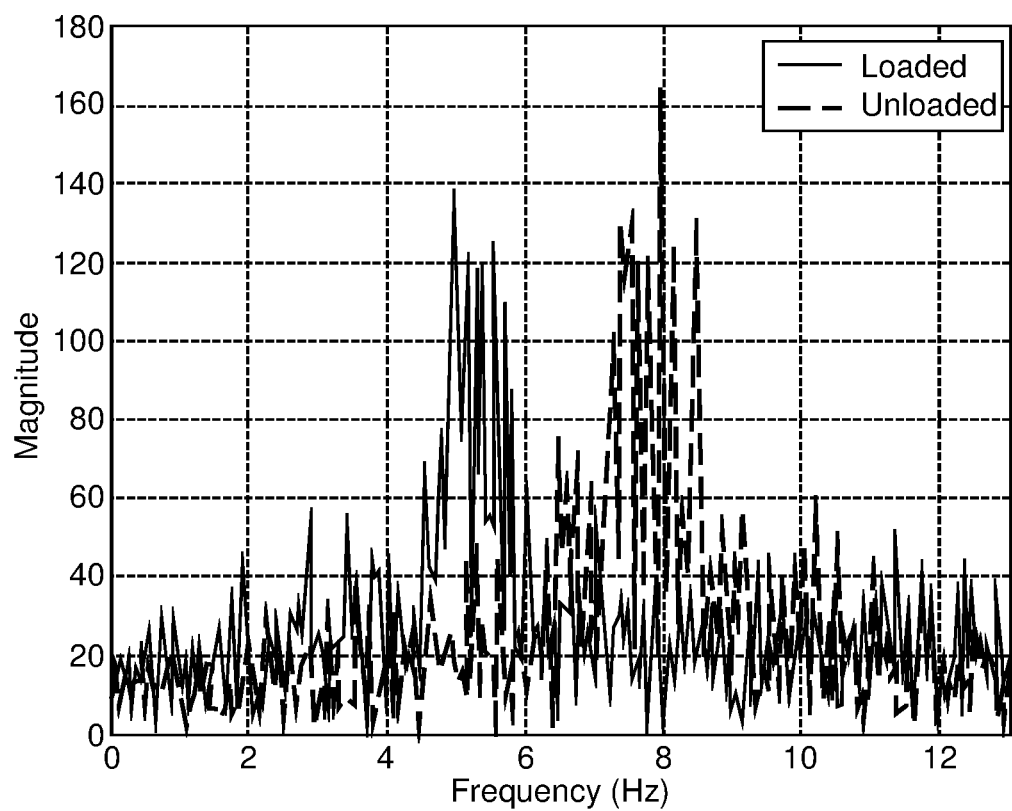
FIG. 5 is a plot showing the vibration magnitude as a function of frequency for a loaded and an unloaded chassis.

For example, reference is now made to FIG. 5, which shows an example plot of the vibration frequencies seen when a chassis is loaded or unloaded with a shipping container, respectively. As seen from FIG. 5, the peak frequency of the vibration shifts when the chassis is loaded.

Based on FIG. 5, by measuring the frequency of vibration as observed by an accelerometer in the vertical direction and/or by a strain gauge, a detection of whether the chassis or trailer is loaded can be made.

One method for using the different frequencies for a loaded and unloaded chassis may be to calculate the energy ratio (eRatio) for a comparison between the lower frequencies and a combination of the lower and higher frequencies. In particular, a pair of bandpass filters, one at a lower-band and one at a higher-band, may be used. Such bandpass filters may be set around the typical loaded and unloaded frequencies to capture the average energy around these frequencies.

After n tests, n log files of raw data from a sensor may be collected. For example, a log file may contain 1024 samples. However, this number of samples is merely provided for illustration, and is not limiting.

The raw data from these files is then processed by a detector, where each of the lower-band bandpass filter (LBPF) and higher-band bandpass filter (HBPF) generates n values of the output averaged energy corresponding to the n log files. For example, these output values may be denoted by $E_L(i)$ and $E_H(i)$, where the subscript "L" and "H" indicate the LBPF and the HBPF respectively, and i=1, 2, . . . , n. In the detector, the energy ratio (eRatio) is further calculated as:

$$R(i) = \frac{E_L(i)}{E_L(i) + E_H(i)} \quad (3)$$

Using equation 3 above, when the cut-off frequencies of both filters are set properly, ideally $E_H(i)$ should be zero when the loading status (LS) is "ON", resulting in R(i) being 1. Conversely, when the LS is "OFF", ideally $E_L(i)$ should be zero and in turn R(i) should also be 0.

Under practical conditions, the energy ratio generally is found to be between zero and one using equation 3 above.

Figure 6:
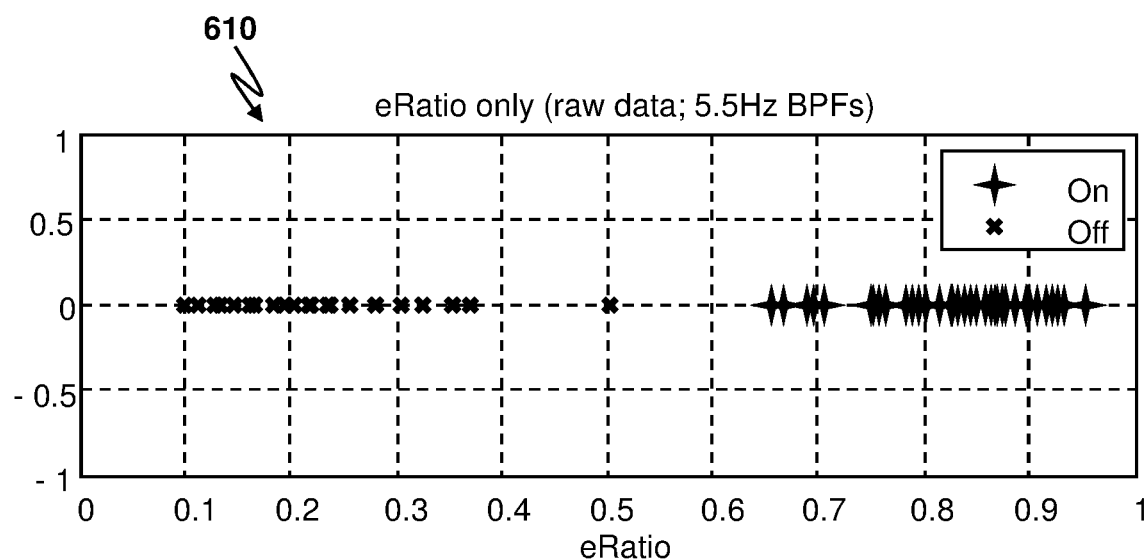
FIG. 6 is a plot showing eRatio distribution on raw data using two bandpass filters.

For example, reference is now made to FIG. 6, which shows a plot 610 of eRatio values obtained in a real world test by analysing raw data with a bandpass of the LBPF set to between 2 and 5.5 Hz and the HBPF set to between 5.5 and 9 Hz. As seen in FIG. 6, when the loading status is off, the eRatio is between approximately 0.1 and 0.5. When the loading status is on, the eRatio falls between approximately 0.6 and 1.

In some cases, it may be easier to deal with a loading status of "off" corresponding to −1 and a loading status of "on" corresponding to 1. In this case, a dependent variable for the eRatio, R'(i), may be defined as:

$$R'(i) = 2R(i) - 1 = \frac{E_L(i) - E_H(i)}{E_L(i) + E_H(i)} \quad (4)$$

Figure 7:
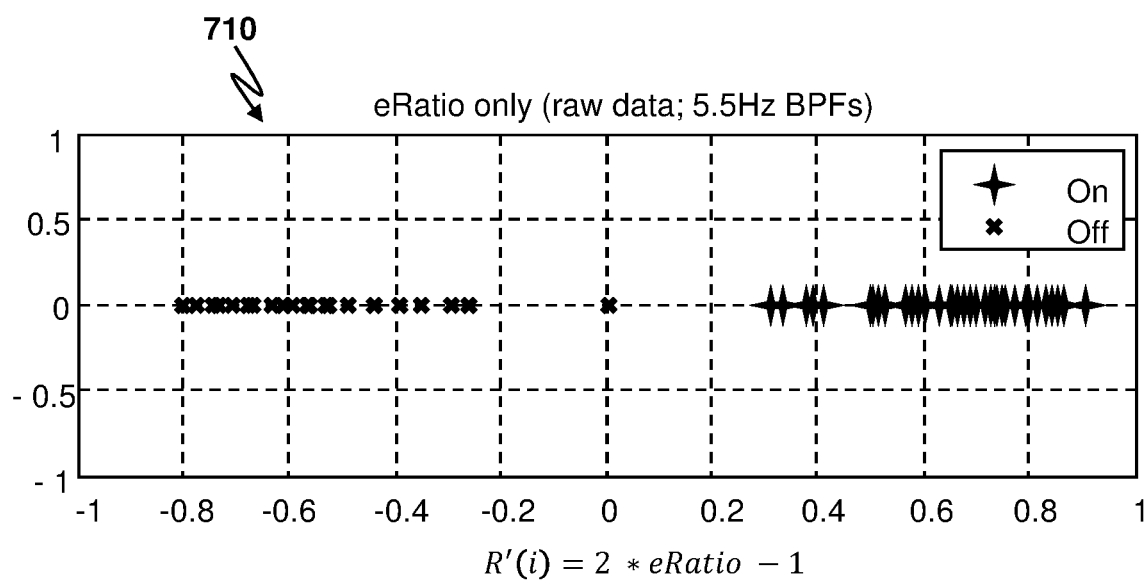
FIG. 7 is a plot showing a dependent variable shift from the plot of FIG. 6.

FIG. 6 may therefore be converted to plot 710 of FIG. 7 for R'(i), thereby making the cut off between the loading status of on and off as "0". In particular, the decision rule in this case would be:

$$LS(i) = \begin{cases} ON & \text{if } R'(i) \geq 0 \\ OFF & \text{otherwise} \end{cases} \quad (5)$$

The above ratios are based solely on the phenomenon that the vibrating frequency (VF) of the chassis spring varies as a function of the loading mass. In particular, heavier loading results in a lower VF. By comparing the energy output from the LBPF and the HBPF using the eRatio, loading status is detected. However, occasionally when R'(i) is close to 0 (i.e. when R(i) is close to 0.5) then the detection is not reliable and may result in an erroneous detection.

Vibration Magnitude

To improve loading status detection reliability, a vibration magnitude (VM) variation may also be considered for loading status. In particular, when a chassis is empty, and therefore lighter, a spring on the chassis will typically vibrate more freely and hence with a higher VM. Conversely, when the chassis is loaded with a heavy container, the spring vibrates with a suppressed magnitude. In other words, the VM also carries certain information about loading status.

Therefore, in accordance with embodiments described below, loading status detection may be based on both the energy ratio, R(i), and the vibration magnitude which is equivalently represented by the values of $E_L(i)$ and $E_H(i)$.

Figure 8:
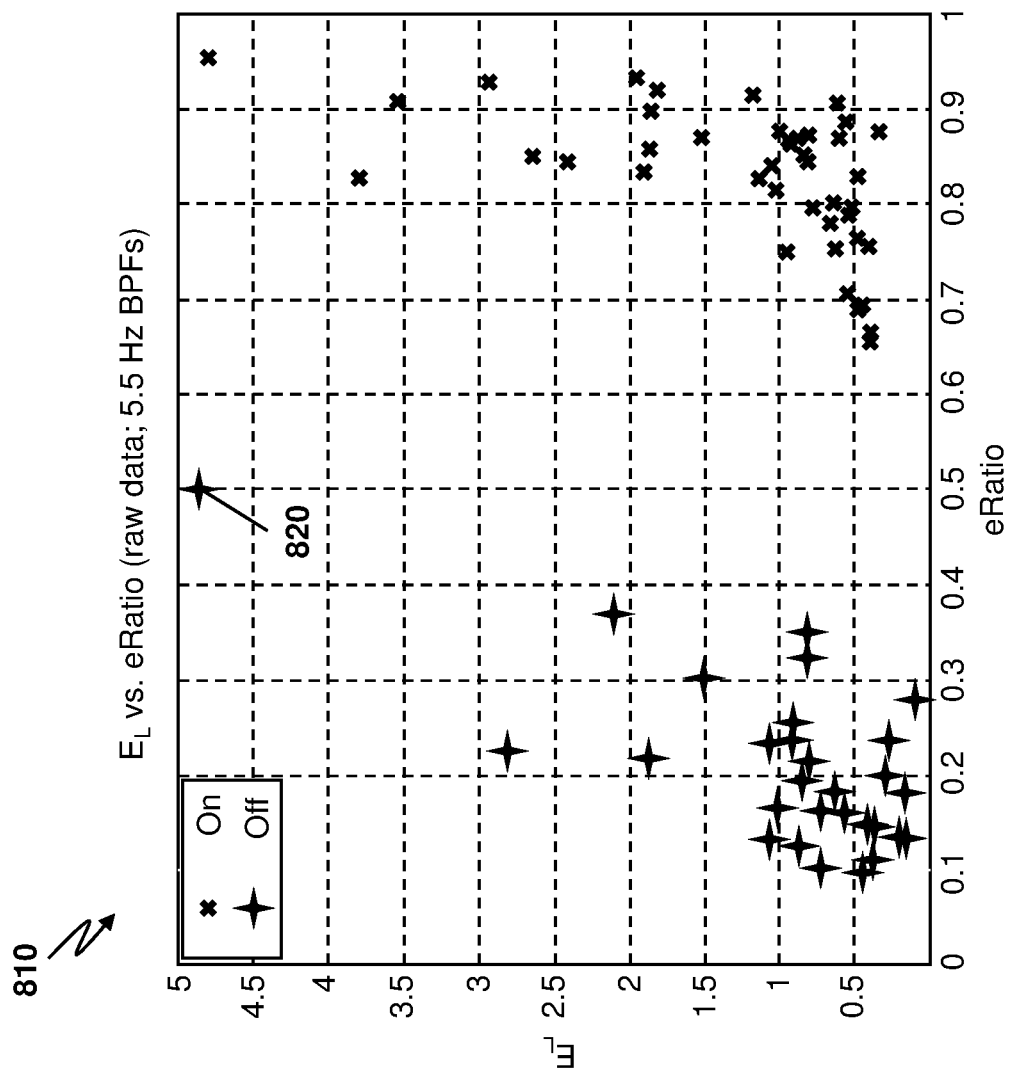
FIG. 8 is a plot on a two dimensional plane showing a relationship between eRatio and the energy of the lower bandpass filter.

Reference is now made to FIG. 8. The embodiment of FIG. 8 shows a plot 810 showing an example relationship between the eRatio and $E_L$. As can be seen from the embodiment of FIG. 8, when both the eRatio and $E_L$ are utilized, the two sets of data can be separated more easily. In particular, referring to the reading with an eRatio of 0.5, shown as point 820, merely using the eRatio would be inconclusive on whether the trailer is loaded or unloaded. However, by using the $E_L$, this point is more easily differentiated as being unloaded.

In order to facilitate such separation, a method widely used in Machine Learning (ML) may be adopted, and a decision variable S(i) is defined for the i-th test data. For instance, if the values of eRatio, $E_L$ and $E_H$ are to be used, equation 6 below may be defined as:

$$S(i) = w_0 + w_1 R(i) + w_2 E_L(i) + w_3 E_H(i) \quad (6)$$

Equation 6 simply means that S(i) is a weighted linear combination of R(i), $E_L(i)$ and $E_H(i)$, with proper weighting coefficients (WC) $w_j$, j=0,1,2 and 3. These WCs are to be optimized.

If only the eRatio and $E_L$ are to be used, then $w_3$ can be set to zero in equation 6 above.

In some cases, optimization may be achieved by training the detector using collected testing results with known loading status. Assuming enough raw data has been collected from n tests with known loading status, the raw data for R(i), $E_L(i)$ and $E_H(i)$ can be derived. Then, using these variables and the known LS, optimum WCs can be obtained by training, as described below.

However, in some cases, the training may be performed for one type of chassis and then the values for the WCs can be propagated to sensor apparatuses in similar chassis. In this case, training would only need to occur in a subset of the chassis.

After training is completed or once the WC values are received at the sensor apparatus, equation 6 above may then be used to calculate the value of S(i). Once the S(i) value is known, a loading status decision may be made based on equation 7 below.

$$LS(i) = \begin{cases} ON & \text{if } S(i) \geq 0 \\ OFF & \text{otherwise} \end{cases} \quad (7)$$

In equation 7 above, the value of "0" is an arbitrarily assigned value decided during training. As will be appreciated by those in the art, when using equation 6, the S(i) value can be found to be around any midpoint by changing the WCs. Therefore, equation 7 is merely one example of a decision equation.

Training

Optimization of the weighting coefficients in equation 6 above through training is a major topic of machine learning. Many well-known ML techniques exist, including but not limited to logistic regression (LR) and neural networks (NN). In these methods, starting from a set of randomly selected initial values for WCs, a certain number of iterative calculations may be performed. WCs are updated in each iteration, and eventually converge to the final values for WCs.

In the embodiments described herein for the application of cargo load detection, two solutions are described as examples for the obtaining of optimum WCs. In a first solution, a minimum-mean squared error (MSE) solution is provided. In a second solution, a support-vector machine (SVM) solution is provided. However, these solutions are provided only for illustration and, in other cases, different optimization algorithms may be utilized to find the values of the WC variables.

Without a loss of generality, it is assumed that a solution to equation 6 above is being found, using the values found for the eRatio, $E_L$ and $E_H$. In particular, raw data from n tests with a known loading status have been collected, and from this raw data, R(i), $E_L(i)$ and $E_H(i)$ have been derived using a pair of the properly designed LBPF and HBPF, where i=1, 2, ..., n. In machine learning these variables are referred to as features, and the known loading status as the target.

Since there are n samples, where each sample has three features associated with one target, for convenience the features may be denoted as $x_{i1}, x_{i2}$, and $x_{i3}$ for R(i), $E_L(i)$ and $E_H(i)$ respectively. The target may be denoted as $y_i$. In one example, the target $y_i=1$ if the known LS(i) is ON and the target $y_i=-1$ if the known LS(i) is OFF.

MSE Solution

Using a minimum-mean squared error approach, since $y_i$ is the target for each test, ideally the decision variable $S(i)=y_i$. Thus from equation 6 above, the equation for each value of i for the training set is:

$$\left.\begin{aligned} y_1 &= w_0 + w_1 x_{11} + w_2 x_{12} + w_3 x_{13} \\ y_2 &= w_0 + w_1 x_{21} + w_2 x_{22} + w_3 x_{23} \\ &\quad \ldots \\ y_n &= w_0 + w_1 x_{n1} + w_2 x_{n2} + w_3 x_{n3} \end{aligned}\right\} \quad (8)$$

The purpose of training is to find a solution for the four unknown WCs which satisfy (8) above under known values of $y_i$ and $x_{ij}$. This may be done by utilizing matrix and vector notation as described below.

In particular, the X matrix may be defined as:

$$X = \begin{bmatrix} 1 & x_{11} & x_{12} & x_{13} \\ 1 & x_{21} & x_{22} & x_{23} \\ & & \ldots & \\ 1 & x_{n1} & x_{n2} & x_{n3} \end{bmatrix} \quad (9)$$

Further, a y matrix may be defined as:

$$y = [y_1 y_2 \ldots y_n]^T \quad (10)$$

And a w matrix may be defined as:

$$w=[w_0 w_1 w_2 w_3]^T \quad (11)$$

In (10) and (11) above, the superscript T denotes a transpose. Using the matrices of (9), (10) and (11) above, the formulas from (8) can be written into a concise form as:

$$y=Xw \quad (12)$$

Mathematically, when the number of samples is greater than the number of features plus 1 (in this case when n>4) then the equations in (8) have no solution. However, there is a uniquely least squares solution for the WCs:

$$w=X \backslash y=(X^T X)^{-1} X^T y \quad (13)$$

In equation 13 above, X\y reads 'y is left-divided by X'. Further, equation 13 is valid if all columns of X are independent. Equation 13 leads to the minimum mean-squared error between y and S=Xw.

In general, to accommodate m features, m≥1, the matrix X of (9) consists of (m+1) columns with the first column consisting of all "1", and w consists of (m+1) WCs.

SVM Solution

A support-vector machine is a supervised binary classification algorithm of ML applicable to the embodiments of the present disclosure. SVM is a robust process to solve both simple and highly complex ML problems with a large number of features and a small number of samples.

After enough training iterations, SVM finds a linear decision surface that can separate the two classes with a maximum margin. In other words, a decision line in 2-D models or a decision hyperplane in multi-dimension models may be found.

Mathematically, SVM gives a solution for the weighting coefficients w which has minimized magnitude ||w|| subject to the constraint of (14) below:

$$YXw \geq 1 \quad (14)$$

In (14) above, 1 is an all-one column vector, and Y is a diagonal matrix whose diagonal elements are $y_j$, j=1, 2, . . . , n, in order. Fast algorithms have been developed to implement SVM. Two non-limiting examples of such algorithms include John C. Platt, "*Sequential Minimal Optimization: A Fast Algorithm for Training Support Vector Machines*", Technical Report MSR-TR-98-14, Apr. 21, 1998; and Stanford University, "*The Simplified SMO Algorithm*", CS 229.

Multiple Pairs of Filters

In the above embodiments, a single pair of bandpass filters was used for the filtering the raw data in order to make loaded/unloaded decisions. This assumes that the passbands represented by the cutoff frequencies of the two bandpass filters have been properly selected.

In practice, in some embodiments it may not be known exactly what or which frequency bands should be selected for each of the two bandpass filters as the passband. In this case, in accordance with an alternative embodiment of the present disclosure, multiple pairs of bandpass filters may be utilized.

In particular, a detector contains K pairs of LBPFs and HBPFs, where K is greater than or equal to one. Each pair of filters is set with different passbands. The raw data from a sensor may then be applied to the K pairs of filters at the same time.

For example, Table 1 below illustrates one case in which K=3, and the passbands for each of the pairs is shown.

TABLE 1

Example of 3 BPF pairs and passbands

| BPF pair index | Passband (Hz) | |
|---|---|---|
| | LBPF | HBPF |
| 1 | 2.0~5.5 | 5.5~9.0 |
| 2 | 2.5~6.0 | 6.0~9.5 |
| 3 | 3.0~6.5 | 6.5~10.0 |

Therefore, as shown in Table 1, each pair of bandpass filters has different cutoff frequencies. For the i-th test, from the k-th BPF pair, k equals 1, 2 and 3, we can derive three variables: $R_k(i)$, $E_{k,L}(i)$, $E_{k,H}(i)$, and in total there are nine variables/features available.

When there are three pairs of the bandpass filters, equation 6 above may be rewritten as:

$$S(i)=w_0+w_1 R_1(i)+w_2 E_{1,L}(i)+w_3 E_{1,H}(i)+w_4 R_2(i)+$$
$$w_5 E_{2,L}(i)+w_6 E_{2,H}(i)+w_7 R_3(i)+w_8 E_{3,L}(i)+$$
$$w_9 E_{3,H}(i) \quad (15)$$

Equation 15 above can be solved through various techniques, including using MSC or SVM as described above. Further, in some cases, if $E_{k,H}(i)$ is ignored then equation 15 may be rewritten as:

$$S(i)=w_0+w_1 R_1(i)+w_2 E_{1,L}(i)+w_3 R_2(i)+w_4 E_{2,L}(i)+$$
$$w_5 R_3(i)+w_6 E_{3,L}(i) \quad (16)$$

Again, equation 16 may be solved through various techniques, including using MSE or SVM as described above.

While the examples above provide for three pairs of bandpass filters, this is merely provided for illustration and more or less pairs of bandpass filters could be utilized. In particular, if only one pair of bandpass filters is utilized and then the solutions described above may be used. However, in some cases two pairs of bandpass filters or four or more pairs of bandpass filters may be used.

Process for Determining Loaded/Unloaded Status

In practice, to make determinations on the loaded/unloaded status of the vehicle, a sensor apparatus associated with the vehicle may measure the vibration frequency and magnitude. In some cases, this raw data may be processed at the sensor apparatus or other computing device associated with the vehicle. In other cases, this data may be provided to a server to perform the processing.

Figure 9:
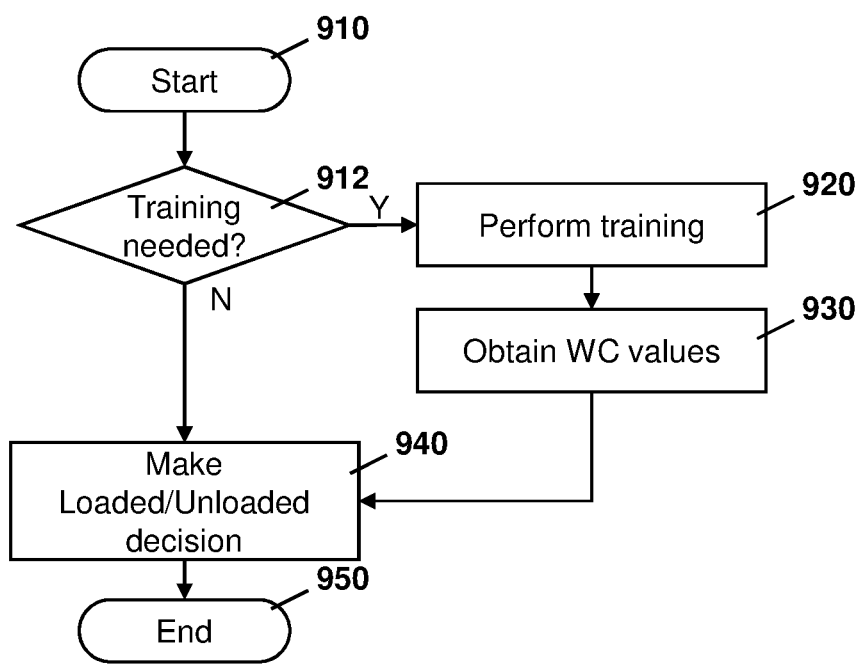
FIG. 9 is a process diagram showing a process to train and then obtain loaded/unloaded decisions for a vehicle.

For example, a high-level overview of a process for making loaded/unloaded decisions is provided in FIG. 9. In the embodiment of FIG. 9, the process starts at block 910 and proceeds to block 912 in which a determination is made on whether training is needed at the particular vehicle. For example, training may not be needed if training has been previously performed and the various weighting coefficients have been previously determined. These weighting coefficients may be stored at a sensor apparatus or computing device associated with a vehicle, or may be stored at a server. Therefore, the determination at block 912 may include finding whether the coefficients are stored at the sensor apparatus/computing device or whether a flag exists at the sensor apparatus/computing device to indicate that the coefficients are stored at a server, among other examples.

In other cases, training may not be needed if the chassis type is similar to other chassis types in which training has already been performed. In this case, a server may pass weighting coefficients to the sensor apparatus or may indicate to the sensor apparatus that weighting coefficients exist at the server.

In other cases, a server may issue a command to a sensor apparatus to start a loaded/unloaded determination. In this case, the command may include the weighting coefficients or an indication that the weighting coefficients exist at the server. If this information is missing from the command, the sensor apparatus or other computing device associated with the vehicle may conclude training is required.

Other examples of where training may not be needed are also possible.

If training is needed, the process proceeds from block 912 to block 920 in which training is performed. The performance of training is described in more detail below with regard to FIGS. 10, 11, and 12.

Once the training has been performed, the process proceeds to block 930 in which the weighting coefficients are determined. The determination of the weighting coefficients may result in that the weighting coefficients being stored at a server or at the sensor apparatus.

After the training is completed, or if training is not needed at block 912, and then sensor apparatus, along with a server in some cases, may make loaded/unloading decisions, as shown at block 940, using the weighting coefficients that were previously determined or assigned to the vehicle.

The process then proceeds to block 950 and ends.

Based on FIG. 9, raw data generated by a sensor associated with the vehicle is collected by a device installed on the chassis. Training may be performed at either the sensor apparatus or by a remote server. A loaded/unloaded decision for new data may then be made by either the device or the server.

If decisions and/or processing are performed by a server, a reliable communication link would typically exist between the sensor apparatus and the server.

Figure 10:
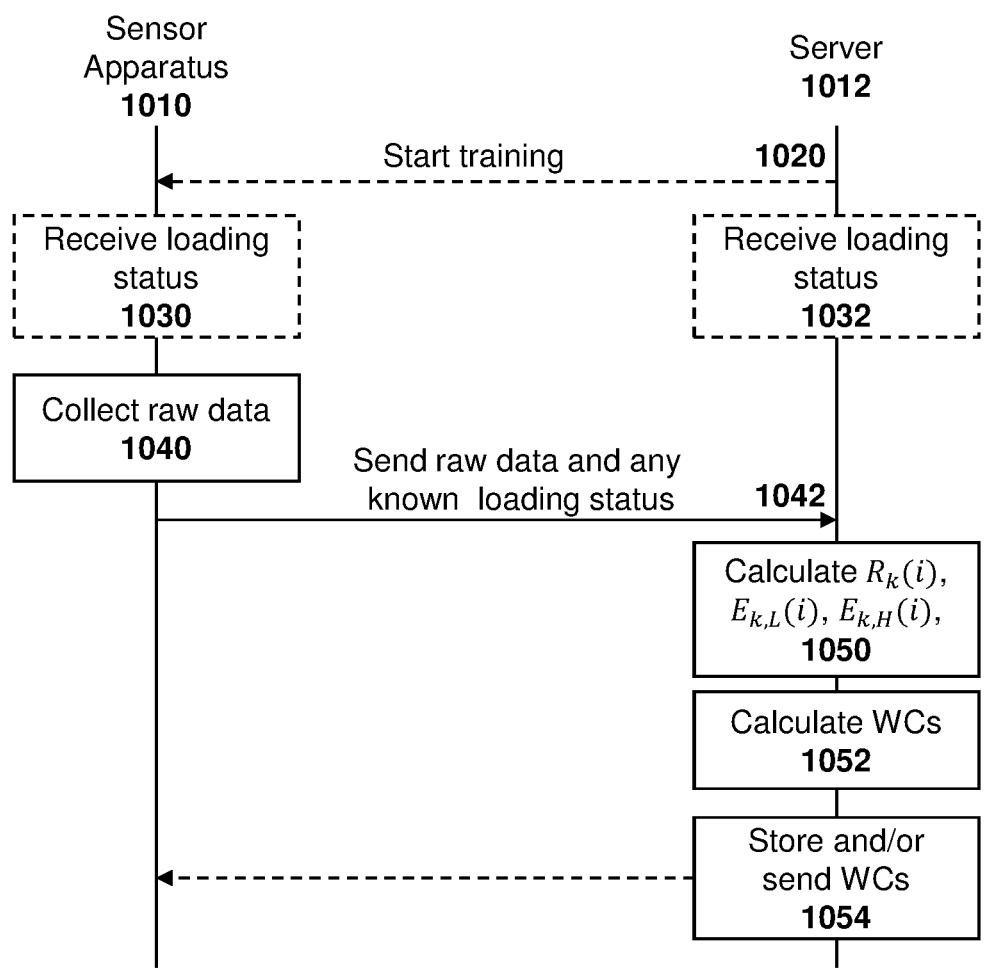
FIG. 10 is a dataflow diagram showing a process for training in which a server calculates the eRatio, $E_L$, and $E_H$, and uses these to calculate weighting constants.
Figure 11:
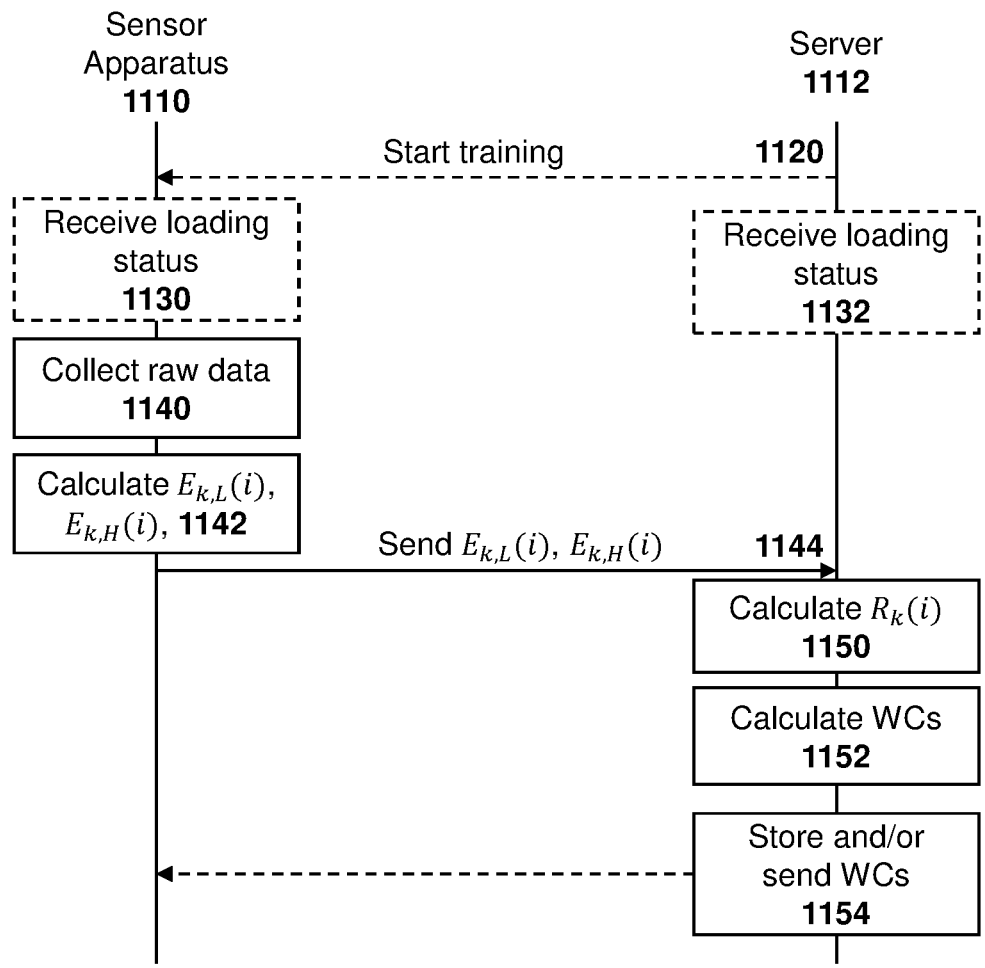
FIG. 11 is a dataflow diagram showing a process for training in which a sensor apparatus calculates the $E_L$, and $E_H$, and passes these to a server to calculate eRatio and weighting constants.
Figure 12:
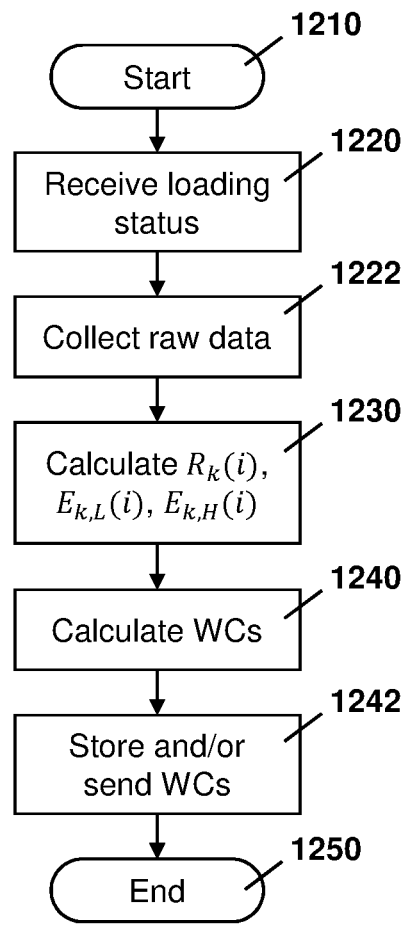
FIG. 12 is a process diagram showing a process for training in which a sensor apparatus calculates the eRatio, $E_L$, and $E_H$, and uses these to calculate weighting constants.

With regard to training, training may occur completely at a server or other similar computing device, as for example illustrated in FIG. 10; at both the sensor apparatus and the server or computing device, as for example illustrated in FIG. 11; or completely at the sensor apparatus or a computing device on a vehicle, as for example illustrated in FIG. 12. Other options or further distributed models are also possible.

Reference is now made to FIG. 10, which shows the primary aspects of the training occurring at a server 1012. In particular, a sensor apparatus 1010 may in some cases receive a command 1020 from a server 1012 to start a training process. However, command 1020 is optional and in other cases, the training may occur based on other factors such as input from a operator of the vehicle, a check within a sensor apparatus 1010 that the weighting coefficients are not known, among other options.

Once the training is started, either the sensor apparatus or the server needs to have a loading status of the the trailer or chassis input. The input may be based on various factors. For example, in some cases an operator of the vehicle may input the loading status into the vehicle or sensor apparatus. This may occur based on a user interface on the sensor apparatus, a user interface on the vehicle itself, or a communication interface that the operator of the vehicle may access. For example, in one case the operator of the vehicle may be required to input the loading status into a text message which is sent to a server or to the sensor apparatus during the training period. In other cases, the operator of the vehicle may be required to press a button or toggle a switch to indicate whether the trailer is loaded or unloaded. Other options for providing information to the sensor apparatus or server about the loading status of the vehicle are also possible.

In other cases, during the training period, a server may know whether the trailer is loaded or unloaded, for example based on a transportation schedule, and use such information to correlate with the sensor data.

In other cases, external inputs may be used to receive the loading status on the vehicle. For example, a camera in a shipping yard may provide visual images of the vehicle as it leaves the shipping yard, thereby identifying whether the trailer is loaded or unloaded. Such image may verify if a container is loaded or unloaded, or may in some cases show the wheels closer to the chassis on a closed container if the trailer is loaded, among other options.

In still other cases, the sensor apparatus may have a secondary mechanism for identifying whether the vehicle is unloaded or loaded, such as cameras, cargo loading detectors such as light beam or laser projectors and detectors to sense whether a closed trailer includes cargo, among other options.

Therefore, as illustrated in FIG. 10, one or both of sensor apparatus 1010 or server 1012 may receive the loading status based on one or more of the above techniques. If the sensor apparatus 1010 is receiving a loading status, this is shown at block 1030. If the server 1012 is receiving the loading status, this is shown at block 1032 in the embodiment of FIG. 10.

Sensor apparatus 1010 may then collect raw data with regard to the frequency and magnitude of vibration, as shown at block 1040. This may be done, for example based on accelerometers or strain gauges, among other options.

Once the raw data is collected, the raw data may be sent to server 1012, as shown by message 1042. If the loading status was received at block 1030, message 1042 may further include the loading status.

In some cases, message 1042 includes a complete set of log information to allow the server 1012 to determine the weighting coefficients. In other cases, message 1042 may be periodically sent with partial information (for example one single log entry). In this case, the steps at blocks 1020, 1030, 1032, 1040 and 1042 may be repeated numerous times to allow server 1012 to compile enough data to determine the weighting coefficients.

Once a complete set of training logs are received at server 1012, the server may then calculate $R_k(i)$, $E_{k,L}(i)$, and $E_{k,H}(i)$, as shown at block 1050. For example, $E_{k,L}(i)$ and $E_{k,H}(i)$ may be calculated by applying one or more of the pairs of bandpass filters. These values may then be used to calculate $R_k(i)$.

Once $R_k(i)$, $E_{k,L}(i)$, and $E_{k,H}(i)$ are calculated, the process proceeds to block 1052 in which the weighting coefficients may be calculated. The calculation of the weighting coefficients may use the MSE or SVM methods as described above, among other options.

Once the weighting coefficients are calculated, the process proceeds to block 1054 in which the weighting coefficients may be stored at the server, provided to the sensor apparatus, or both stored at the server and provided to the sensor apparatus.

At this point the training is finished and the weighting coefficients may then be used for the loaded/unloaded determinations.

In some cases, more of the processing can be performed at the sensor apparatus or similar computing device associated with the vehicle. Reference is now made to FIG. 11.

In the embodiment of FIG. 11, sensor apparatus 1110 communicates with server 1112.

As with the embodiment of FIG. 10, in the embodiment of Figure 11the server 1112 may signal to sensor apparatus 1110 to start training, as shown at message 1120. However, message 1120 is optional.

Further, similar to the embodiment of FIG. 10, the loading status may be received at one or both of the sensor apparatus 1110 or server 1112, as for example shown with blocks 1130 and 1132.

The sensor apparatus 1110 then collects raw data, as shown by block 1140. One a complete training log is compiled, in the embodiment of FIG. 11 the process then proceeds to block 1142, in which the sensor apparatus or computing device associated with the vehicle calculates $E_{k,L}(i)$, and $E_{k,H}(i)$ based on the one or more bandpass filter pairs.

Once calculated, the sensor apparatus 1110 may then provide $E_{k,L}(i)$, and $E_{k,H}(i)$ to server 1112 in message 1144. Further, if the loading status was received at block 1130, the loading status may also be provided in message 1144 to server 1112.

Server 1112, once having received all of the log information in one or more messages 1144, may then calculate the $R_k(i)$, as shown at block 1150.

The process then proceeds to block 1152 in which the weighting coefficients may be calculated, for example as provided above.

The process then proceeds to block 1154 in which the server 1112 may store the weighting coefficients, send the weighting coefficients to sensor apparatus 1110, or both store the weighting coefficients and send the weighting coefficients to sensor apparatus 1110.

Thereafter, the weighting coefficients may be used to calculate loaded/unloaded status on the vehicle.

In still a further embodiment, the processing may be completely done at the sensor apparatus. Reference is now made to FIG. 12.

In the embodiment of FIG. 12, the process starts at block 1210. The process may start, for example, based on a trigger to start training process. Such trigger may be a command from a server, identification that weighting coefficients do not exist on the trailer, a manual indication that training is to occur, among other options.

The process then proceeds to block 1220, in which the loading status of the vehicle is input or received at the sensor apparatus. The loading status may be provided to the sensor apparatus, for example, based on manual input from an operator of the vehicle, from sensors on the vehicle or in the area surrounding the vehicle, from commands or information provided by a server or other computing device, among other options.

The process then proceeds to block 1222 in which the raw data is collected. Such raw data may include the readings from an accelerometer and/or a stress gauge, among other options.

From block 1222, the process proceeds to block 1230 in which that the $R_k(i)$, $E_{k,L}(i)$, and $E_{k,H}(i)$ are calculated based on one or more bandpass filter pairs.

The process then proceeds to block 1240 in which the weighting coefficients are calculated based on the techniques described above or based on similar techniques.

The process then proceeds to block 1242 in which the weighting coefficients are stored at the sensor apparatus, sent to the server, or both stored at the sensor apparatus and sent to the server.

From block 1242, the process proceeds to block 1250 and ends.

The weighting coefficients calculated at block 1240 may thereafter be used for making loaded/unloaded decisions.

Figure 13:
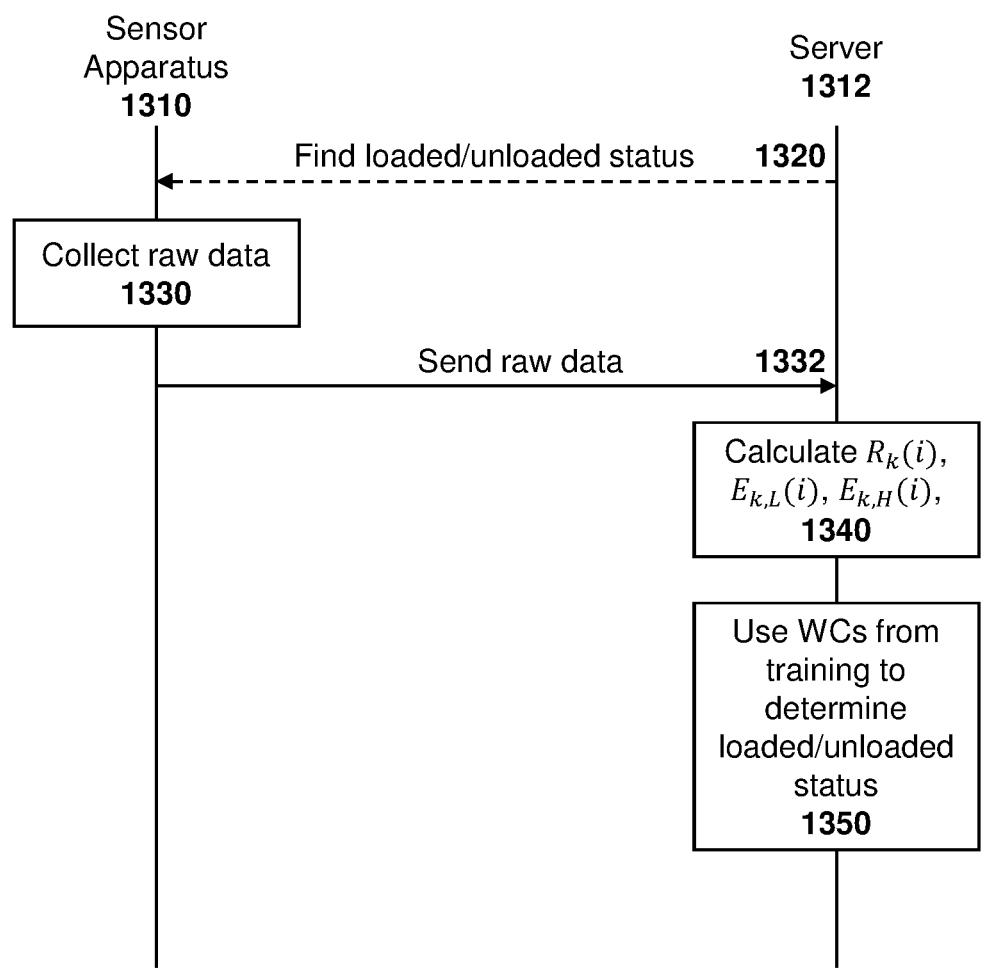
FIG. 13 is a dataflow diagram showing a process for making loaded/unloaded decisions in which a server calculates the eRatio, $E_L$, and $E_H$, and uses these and weighting constants to find a decision variable.
Figure 14:
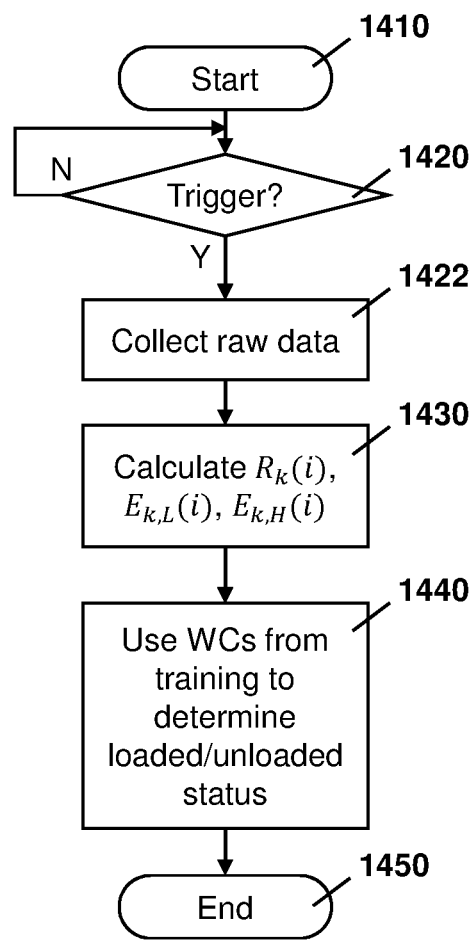
FIG. 14 is a dataflow diagram showing a process for making loaded/unloaded decisions in which a sensor apparatus calculates the eRatio, $E_L$, and $E_H$, and uses these and weighting constants to find a decision variable.

Once training is complete, the weighting coefficients may be used by one or both of the sensor apparatus and server to calculate a loaded/unloaded status. Reference is now made to FIGS. 13 and 14.

In the embodiment of FIG. 13, the determination of whether the vehicle is loaded or unloaded is done at a server. In particular, a sensor apparatus 1310 communicates with a server 1312. In some cases, server 1312 may provide a command 1320 to the sensor apparatus 1310 to make a determination of whether the vehicle is loaded or unloaded. In other cases, a sensor apparatus 1310 may make periodic determinations of loaded or unloaded status, or some other trigger at the sensor apparatus 1310 may cause the start of the process to determine whether the trailer is unloaded are loaded.

The process then proceeds to block 1330 in which raw data including the frequency of vibration and the magnitude of vibration is obtained.

The raw data may then be provided to the server 1312, as shown by message 1332. In some cases, if the weighting coefficients are stored at the sensor apparatus 1310, message 1332 may further include the weighting coefficients for the vehicle.

On receiving message 1332, the server 1312 may calculate $R_k(i)$, $E_{k,L}(i)$, and $E_{k,H}(i)$ as provided above. This is done, for example, at block 1340 in the embodiment of FIG. 13.

The process then proceeds to block 1350 in which the weighting coefficients which are either stored at server 1312 or received in message 1332 may be used to determine the loaded/unloaded status of the vehicle. For example, equations 6, 15 or 16 may be used to find decision variable S(i). Once found, the decision variable may then be input into equation 7 to determine whether the vehicle is loaded or unloaded. The equations may be solved, for example, by placing the variables into a matrix X from equation 9 above and then using w and X from equation 12.

In other cases, the processing may completely be done at the sensor apparatus. Reference is now made to FIG. 14.

The process of FIG. 14 starts at block 1410 and proceeds to block 1420 in which a check is made to determine whether a trigger condition has been met to perform a loaded/unloaded status check. As indicated above, such trigger may include a message from a server, a timer timing out, an external factor such as a geolocation being entered or exited, a manual input, among other options.

Once the trigger is met, the process proceeds to block 1422 in which the raw data for the vehicle is collected. This may include sensor readings from an accelerometer and/or a stress gauge, among other options.

From block 1422 the process proceeds to block 1430 in which the $R_k(i)$, $E_{k,L}(i)$, and $E_{k,H}(i)$ are calculated as described above.

The process then proceeds to block 1450 in which the weighting coefficients stored at the sensor apparatus (or received from a server) may be used to determine the loaded/unloaded status of the vehicle. For example, equations 6, 15 or 16 may be used to find decision variable S(i). Once found, the decision variable may then be input into equation 7 to determine whether the vehicle is loaded or unloaded. The equations may be solved, for example, by placing the variables into a matrix X from equation 9 above and then using w and X from equation 12.

In some cases, once the the loaded/unloaded status is determined, the sensor apparatus may report this status to the server (not shown).

The process then proceeds to block 1450 and ends.

The embodiments of FIGS. 9 to 14 therefore provide for training and subsequent determination of loaded/unloaded status utilizing both of the frequency of vibration and magnitude of vibration.

Practical Example 1

The embodiments above were tested in a real world environment. In particular, as shown in Table 2 in Appendix A below, relevant data with known loading status is provided. In Table 2, the third column lists the the known loading status, where 1 indicates loaded and −1 indicates unloaded. This loading status constitutes the vector y from equation 12 above. The fourth, fifth and sixth columns of Table 2 list the R(i), $E_L$(i), and $E_H$(i) respectively. These columns constitute the last three columns of the matrix X from equation 9 above.

As a simple example, consider a loading status detector utilizing two features, namely the R(i) and $E_L$(i). Calculating using equation 13 for MSE, weighting coefficients $w_{MSE}$= $[-1.4742, 3.1522, -0.1449]^T$ are found. On the other hand, with SVM, the weighting coefficients are $w_{SVM}$=$[-2.9758, 6.3533, -0.3371]^T$.

To see the improvement compared to the detection scheme based on R'(i) only, the following from equation 17 was calculated:

$$S=Xw \quad (17)$$

The resultant S(i) is listed in the $2^{nd}$~$4^{th}$ columns of Table 4 in Appendix C.

Figure 15A:
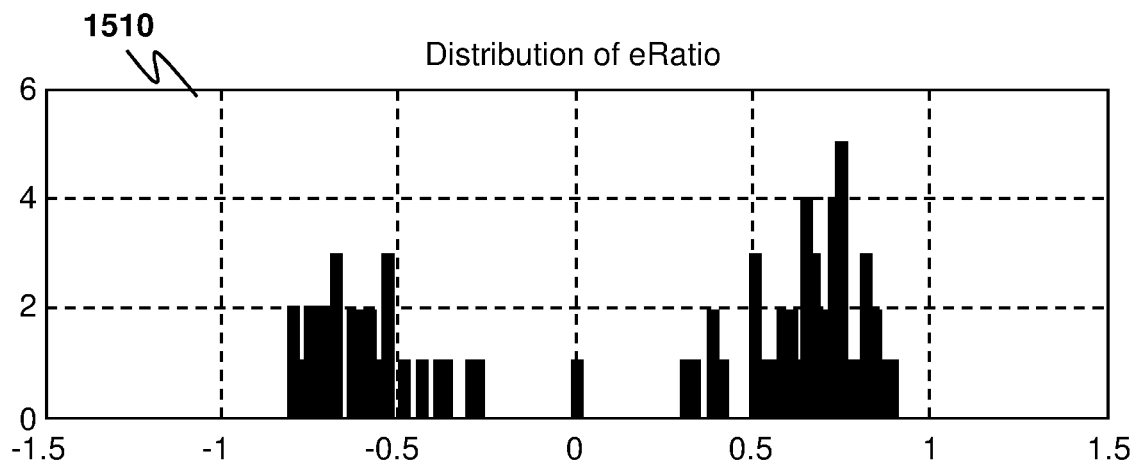
FIG. 15A is a plot showing a histogram of the distribution of decision variables based on eRatio.
Figure 15B:
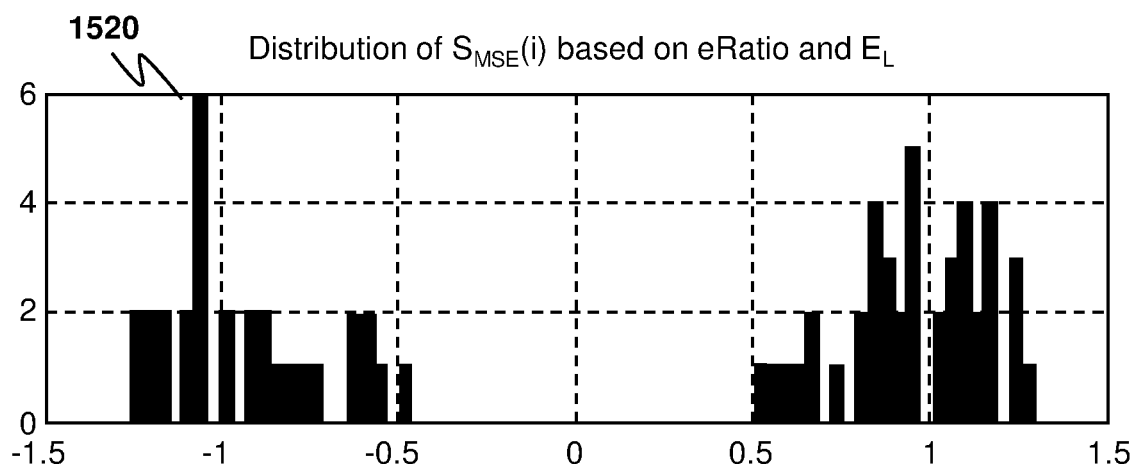
FIG. 15B is a plot showing a histogram of the distribution of decision variables based on minimum-mean squared error (MSE) solutions.

The histogram distributions of the decision variables obtained from MSE vs. based on eRatio only are shown in FIGS. 15A and 15B. In particular, FIG. 15A shows the histogram distribution 1510 based on eRatio only. FIG. 15B shows the histogram distribution 1520 based on MSE.

Figure 16A:
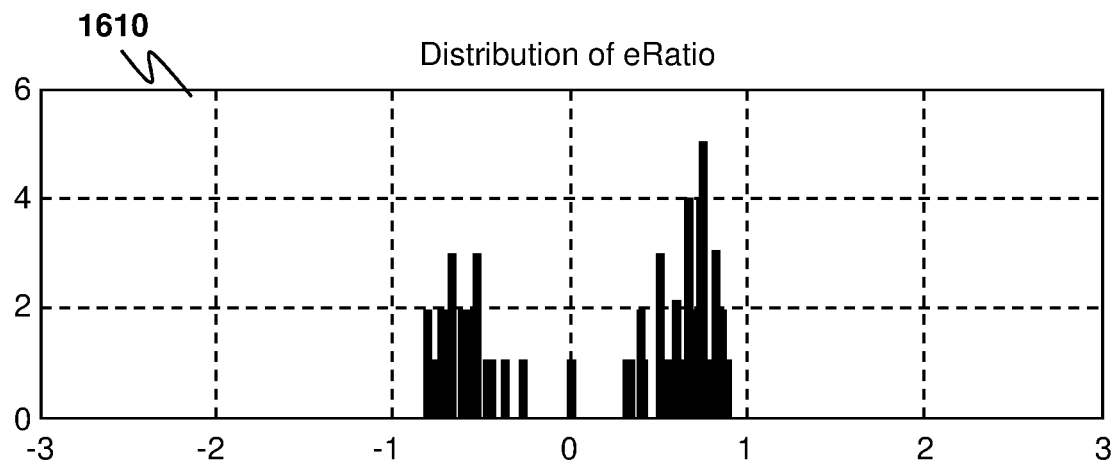
FIG. 16A is a plot showing a histogram of the distribution of decision variables based on eRatio.
Figure 16B:
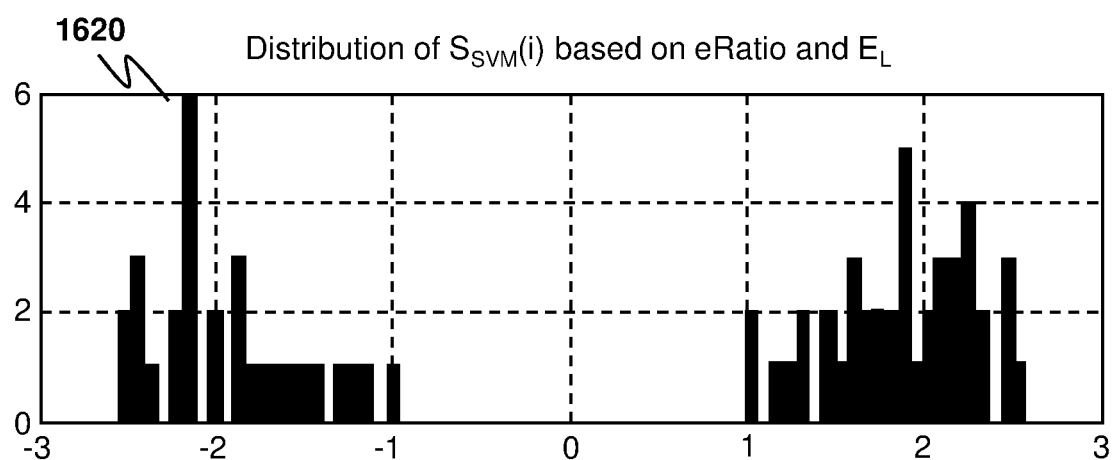
FIG. 16B is a plot showing a histogram of the distribution of decision variables based on support-vector machine (SVM) solutions.

The histogram distributions of the decision variables obtained from SVM vs. based on eRatio only are shown in FIGS. 16A and 16B. In particular, FIG. 16A shows the histogram distribution 1610 based on eRatio only. FIG. 16B shows the histogram distribution 1620 based on SVM.

In the examples of FIGS. 15A, 15B, 16A and 16B, it can be seen the detection reliability with SVM is better than that with MSE, while MSE is better than the detector based on eRatio only.

Figure 17:
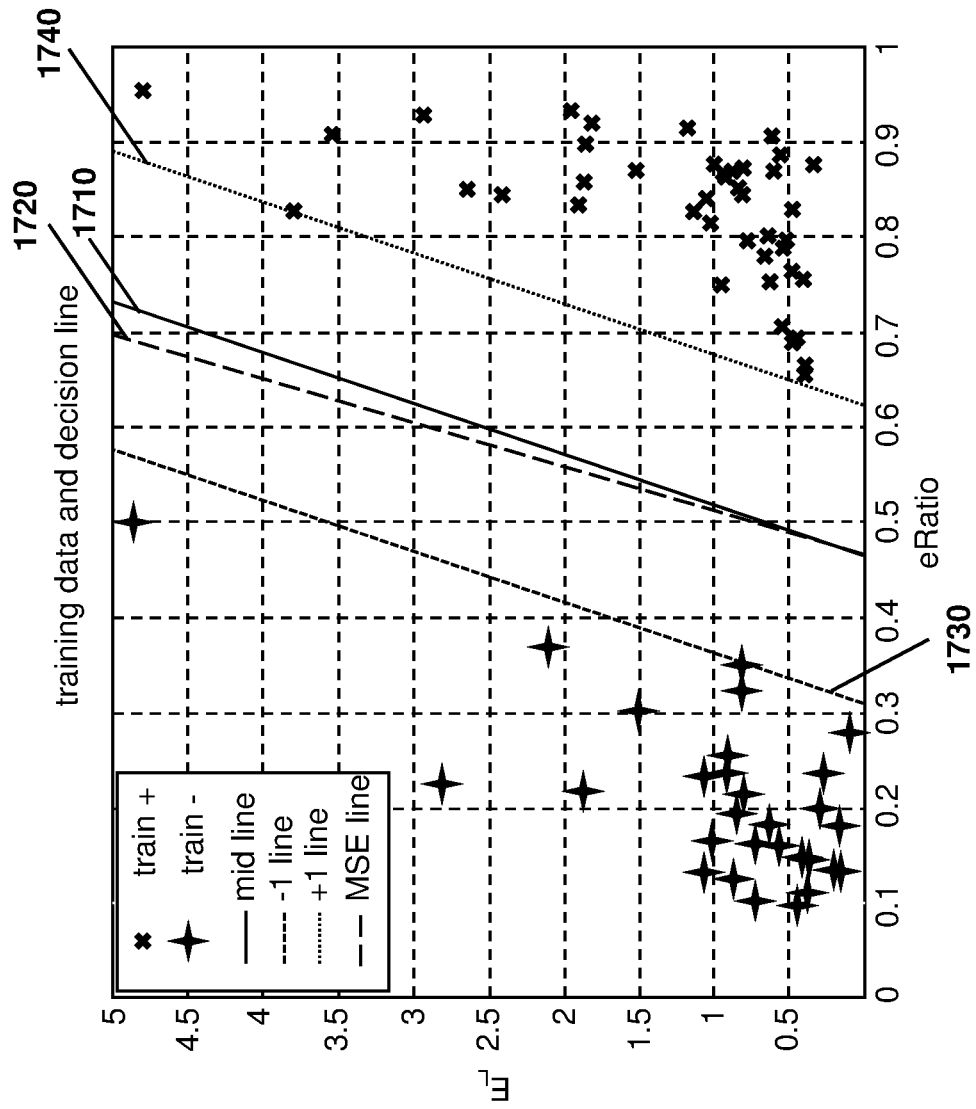
FIG. 17 is a plot on a two dimensional plane showing a relationship between eRatio and the energy of the lower bandpass filter and having MSE and SVM decision lines.

FIG. 17 shows the decision lines for MSE and SVM on the 2D plane of FIG. 8. Line 1710 in FIG. 17 is the SVM decision line to separate the two statuses, and line 1720 is the MSE decision line. It is seen that the SVM line gives the maximum gap between the two sets of the data, as seen for example with −1 line 1730 and +1 line 1740.

Practical Example 2

In another example, the outputs R(i) and $E_L$(i) from each of the three pairs of BPFs specified in Table 1 are used to train SVM. The training data is provided in Table 3 of Appendix B below. Correspondingly, the new decision variable is designated pursuant to equation 16 above.

After training with SVM, the weighting coefficients obtained are w=$[-2.942, 3.433, 1.439, 2.098, 0.063, 0.407, -1.369]^T$.

The relevant data and results are listed in the last column of Table 4 in Appendix C below.

Figure 18A:
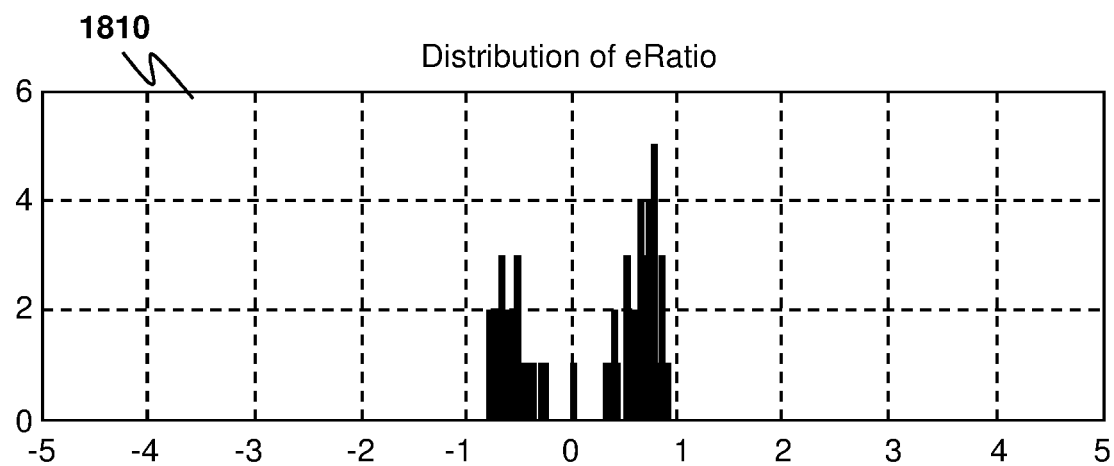
FIG. 18A is a plot showing a histogram of the distribution of decision variables based on eRatio.
Figure 18B:
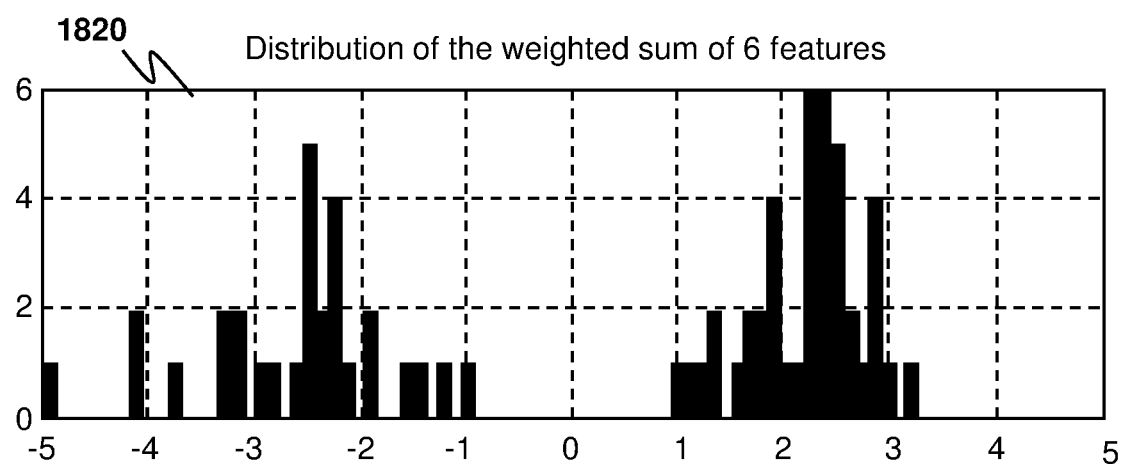

FIGS. 18A and 18B show the distribution of the decision variable with 3 BPF pairs vs. with that based on eRatio of a single pair of BPF. In particular, FIG. 18A shows the histogram distribution 1810 based on eRatio only. FIG. 18B shows the histogram distribution 1820 based on the weighted sum of six features. One benefit of the embodiment of FIG. 18B is that there is no need to select the passbands of the BPFs, which now is determined by training automatically.

Servers

A server such as servers 340, 342 or 350 may be any network node. For example, one simplified server that may perform the embodiments described above is provided with regards to FIG. 19.

Figure 19:
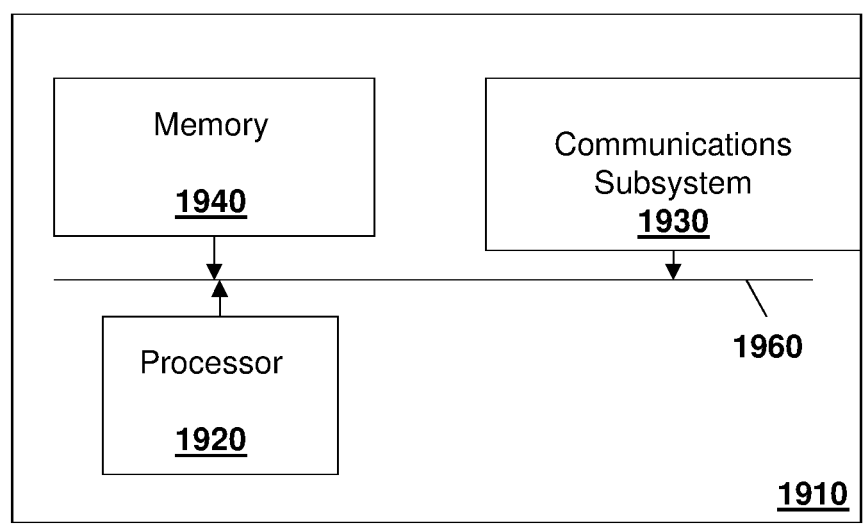
FIG. 19 is a block diagram of an example computing device or server capable of being used with the embodiments of the present disclosure.

In FIG. 19, server 1910 includes a processor 1920 and a communications subsystem 1930, where the processor 1920 and communications subsystem 1930 cooperate to perform the methods of the embodiments described herein.

The processor 1920 is configured to execute programmable logic, which may be stored, along with data, on the server 1910, and is shown in the example of FIG. 19 as memory 1940. The memory 1940 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 1920 may also be implemented entirely in hardware and not require any stored program to execute logic functions.

Alternatively, or in addition to the memory 1940, the server 1910 may access data or programmable logic from an external storage medium, for example through the communications subsystem 1930.

The communications subsystem 1930 allows the server 1910 to communicate with other devices or network elements.

Communications between the various elements of the server 1910 may be through an internal bus 1960 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

APPENDIX A

TABLE 2

Training Data for a Single BPF Pair ((2~5.5) + (5.5-9) Hz)

| File Name | Log # | Known LS | eRatio | EL | EH |
|---|---|---|---|---|---|
| Asset208449-FLX1970A031718009AE | 48 | 1 | 0.7497 | 0.9388 | 0.3134 |
| | 49 | 1 | 0.8323 | 1.9054 | 0.3839 |
| | 50 | 1 | 0.8292 | 3.7833 | 0.7794 |
| | 51 | 1 | 0.9065 | 3.5198 | 0.3632 |
| | 52 | 1 | 0.9156 | 1.1674 | 0.1076 |
| | 53 | 1 | 0.8481 | 2.6390 | 0.4727 |
| | 54 | 1 | 0.9209 | 1.8088 | 0.1553 |
| | 55 | 1 | 0.9275 | 2.9306 | 0.2291 |
| | 56 | 1 | 0.8516 | 0.8201 | 0.1430 |
| | 57 | 1 | 0.8445 | 2.4012 | 0.4422 |
| | 58 | 1 | 0.9326 | 1.9563 | 0.1414 |
| | 59 | 1 | 0.84 | 1.0406 | 0.1982 |
| | 60 | 1 | 0.9532 | 4.8004 | 0.2357 |
| | 61 | 1 | 0.8588 | 1.8466 | 0.3037 |
| | 62 | −1 | 0.5 | 4.8886 | 4.8877 |
| | 63 | −1 | 0.3701 | 2.0986 | 3.5713 |
| | 64 | −1 | 0.3515 | 0.8174 | 1.5082 |
| | 65 | −1 | 0.2396 | 0.9107 | 2.8908 |
| Asset433027-FLX1970A031618006AB | 104 | 1 | 0.7066 | 0.5319 | 0.2209 |
| | 105 | 1 | 0.6669 | 0.3782 | 0.1889 |
| | 106 | 1 | 0.7823 | 0.6574 | 0.1829 |
| | 107 | 1 | 0.7518 | 0.6189 | 0.2043 |
| | 108 | 1 | 0.8698 | 0.8918 | 0.1334 |
| | 109 | 1 | 0.6544 | 0.3847 | 0.2032 |
| | 110 | 1 | 0.8024 | 0.6423 | 0.1581 |
| | 111 | 1 | 0.6908 | 0.4550 | 0.2036 |
| | 112 | 1 | 0.874 | 0.7852 | 0.1132 |
| | 113 | 1 | 0.8982 | 1.8372 | 0.2082 |
| | 114 | 1 | 0.764 | 0.4767 | 0.1472 |
| | 115 | 1 | 0.6952 | 0.4473 | 0.1961 |
| | 116 | 1 | 0.8866 | 0.5430 | 0.0694 |
| | 117 | −1 | 0.2347 | 1.0660 | 3.4767 |
| | 118 | −1 | 0.1597 | 0.5663 | 2.9787 |
| | 119 | −1 | 0.1957 | 0.8602 | 3.5348 |
| | 120 | −1 | 0.2166 | 1.8590 | 6.7222 |
| | 121 | −1 | 0.2352 | 0.2655 | 0.8635 |
| | 122 | −1 | 0.1991 | 0.3051 | 1.2268 |
| | 123 | −1 | 0.3036 | 1.4941 | 3.4272 |
| | 124 | −1 | 0.3245 | 0.8070 | 1.6801 |
| | 125 | −1 | 0.2551 | 0.8932 | 2.6082 |
| | 126 | −1 | 0.1617 | 0.7205 | 3.7341 |
| | 127 | −1 | 0.2269 | 2.8057 | 9.5576 |
| | 128 | −1 | 0.2801 | 0.0594 | 0.1527 |
| | 75 | 1 | 0.8684 | 0.5964 | 0.0904 |
| | 76 | 1 | 0.9067 | 0.6051 | 0.0623 |
| Asset454009-FLX1970A031618006AE | 77 | 1 | 0.8646 | 0.9494 | 0.1487 |
| | 78 | 1 | 0.7971 | 0.5246 | 0.1335 |
| | 79 | 1 | 0.8436 | 0.8036 | 0.1490 |
| | 80 | 1 | 0.8774 | 0.9959 | 0.1391 |
| | 81 | 1 | 0.8702 | 1.5127 | 0.2256 |
| | 82 | 1 | 0.8635 | 0.9256 | 0.1463 |
| | 83 | 1 | 0.7573 | 0.3962 | 0.1270 |
| | 84 | 1 | 0.8776 | 0.3224 | 0.0450 |
| | 87 | 1 | 0.8271 | 1.1283 | 0.2358 |
| | 88 | 1 | 0.789 | 0.5321 | 0.1423 |
| | 89 | 1 | 0.829 | 0.4714 | 0.0972 |
| | 90 | 1 | 0.7964 | 0.7724 | 0.1974 |
| | 91 | 1 | 0.8138 | 1.0169 | 0.2327 |
| | 92 | −1 | 0.1323 | 1.0562 | 6.9282 |
| | 93 | −1 | 0.1341 | 0.1930 | 1.2462 |
| | 94 | −1 | 0.0969 | 0.4666 | 4.3480 |
| | 95 | −1 | 0.165 | 1.0152 | 5.1389 |
| | 96 | −1 | 0.1491 | 0.4239 | 2.4198 |

TABLE 2-continued

Training Data for a Single BPF Pair ((2~5.5) + (5.5-9) Hz)

| File Name | Log # | Known LS | eRatio | EL | EH |
|---|---|---|---|---|---|
| | 97 | −1 | 0.1108 | 0.3769 | 3.0258 |
| | 98 | −1 | 0.103 | 0.7284 | 6.3433 |
| | 99 | −1 | 0.215 | 0.7899 | 2.8840 |
| | 100 | −1 | 0.184 | 0.6384 | 2.8317 |
| | 101 | −1 | 0.1352 | 0.1593 | 1.0190 |
| | 102 | −1 | 0.1458 | 0.3729 | 2.1841 |
| | 103 | −1 | 0.1248 | 0.8750 | 6.1380 |
| | 104 | −1 | 0.1817 | 0.1689 | 0.7604 |

APPENDIX B

TABLE 3

Training Data for Three BPF Pairs

| Known LS | 1st BPF Pair (2~5.5) + (5.5~9) Hz | | | 2nd BPF Pair (2.5~6) + (6~9.5) Hz | | | 3rd BPF Pair (3~6.5) + (6.5 + 10) Hz | | |
|---|---|---|---|---|---|---|---|---|---|
| | eRatio | $E_L$ | $E_H$ | eRatio | $E_L$ | $E_H$ | eRatio | $E_L$ | $E_H$ |
| 1 | 0.7497 | 0.9388 | 0.3134 | 0.7800 | 0.9928 | 0.2800 | 0.7939 | 1.0014 | 0.2600 |
| 1 | 0.8323 | 1.9054 | 0.3839 | 0.8876 | 2.0123 | 0.2548 | 0.9176 | 2.0483 | 0.1840 |
| 1 | 0.8292 | 3.7833 | 0.7794 | 0.8717 | 3.9975 | 0.5884 | 0.8877 | 4.0027 | 0.5066 |
| 1 | 0.9065 | 3.5198 | 0.3632 | 0.9282 | 3.6239 | 0.2803 | 0.9337 | 3.6114 | 0.2566 |
| 1 | 0.9156 | 1.1674 | 0.1076 | 0.9296 | 1.1870 | 0.0899 | 0.9343 | 1.1705 | 0.0823 |
| 1 | 0.8481 | 2.6390 | 0.4727 | 0.8556 | 2.7315 | 0.4610 | 0.8472 | 2.7391 | 0.4942 |
| 1 | 0.9209 | 1.8088 | 0.1553 | 0.9543 | 1.8694 | 0.0896 | 0.9665 | 1.8593 | 0.0645 |
| 1 | 0.9275 | 2.9306 | 0.2291 | 0.9506 | 2.9937 | 0.1556 | 0.9620 | 2.9784 | 0.1177 |
| 1 | 0.8516 | 0.8201 | 0.1430 | 0.8641 | 0.8149 | 0.1282 | 0.8682 | 0.7835 | 0.1189 |
| 1 | 0.8445 | 2.4012 | 0.4422 | 0.8633 | 2.3682 | 0.3750 | 0.8699 | 2.2399 | 0.3351 |
| 1 | 0.9326 | 1.9563 | 0.1414 | 0.9511 | 1.9997 | 0.1027 | 0.9562 | 1.9865 | 0.0910 |
| 1 | 0.84 | 1.0406 | 0.1982 | 0.8591 | 1.0632 | 0.1744 | 0.8717 | 1.0607 | 0.1561 |
| 1 | 0.9532 | 4.8004 | 0.2357 | 0.9742 | 4.9455 | 0.1308 | 0.9803 | 4.9241 | 0.0988 |
| 1 | 0.8588 | 1.8466 | 0.3037 | 0.8801 | 1.8719 | 0.2549 | 0.8910 | 1.8419 | 0.2254 |
| −1 | 0.5 | 4.8886 | 4.8877 | 0.6621 | 6.3487 | 3.2402 | 0.7686 | 7.3643 | 2.2175 |
| −1 | 0.3701 | 2.0986 | 3.5713 | 0.5331 | 2.9479 | 2.5821 | 0.6850 | 3.7629 | 1.7305 |
| −1 | 0.3515 | 0.8174 | 1.5082 | 0.4623 | 1.0888 | 1.2665 | 0.5748 | 1.3659 | 1.0104 |
| −1 | 0.2396 | 0.9107 | 2.8908 | 0.3393 | 1.3285 | 2.5870 | 0.4551 | 1.7991 | 2.1537 |
| 1 | 0.7066 | 0.5319 | 0.2209 | 0.7461 | 0.5728 | 0.1950 | 0.7525 | 0.5729 | 0.1884 |
| 1 | 0.6669 | 0.3782 | 0.1889 | 0.6781 | 0.3909 | 0.1856 | 0.6704 | 0.3932 | 0.1933 |
| 1 | 0.7823 | 0.6574 | 0.1829 | 0.8211 | 0.6977 | 0.1520 | 0.8412 | 0.7043 | 0.1329 |
| 1 | 0.7518 | 0.6189 | 0.2043 | 0.7763 | 0.6448 | 0.1858 | 0.7881 | 0.6557 | 0.1763 |
| 1 | 0.8698 | 0.8918 | 0.1334 | 0.9131 | 0.9507 | 0.0905 | 0.9304 | 0.9449 | 0.0707 |
| 1 | 0.6544 | 0.3847 | 0.2032 | 0.6935 | 0.4191 | 0.1852 | 0.7052 | 0.4277 | 0.1788 |
| 1 | 0.8024 | 0.6423 | 0.1581 | 0.8400 | 0.6791 | 0.1294 | 0.8516 | 0.6839 | 0.1192 |
| 1 | 0.6908 | 0.4550 | 0.2036 | 0.7153 | 0.4802 | 0.1911 | 0.7265 | 0.4830 | 0.1819 |
| 1 | 0.874 | 0.7852 | 0.1132 | 0.9255 | 0.8441 | 0.0679 | 0.9397 | 0.8398 | 0.0539 |
| 1 | 0.8982 | 1.8372 | 0.2082 | 0.9154 | 1.8231 | 0.1686 | 0.9285 | 1.7585 | 0.1355 |
| 1 | 0.764 | 0.4767 | 0.1472 | 0.7892 | 0.4931 | 0.1317 | 0.7903 | 0.4948 | 0.1313 |
| 1 | 0.6952 | 0.4473 | 0.1961 | 0.7298 | 0.4755 | 0.1760 | 0.7449 | 0.4772 | 0.1635 |
| 1 | 0.8866 | 0.5430 | 0.0694 | 0.9244 | 0.5592 | 0.0457 | 0.9419 | 0.5513 | 0.0340 |
| −1 | 0.2347 | 1.0660 | 3.4767 | 0.3299 | 1.5389 | 3.1257 | 0.4346 | 2.0766 | 2.7021 |
| −1 | 0.1597 | 0.5663 | 2.9787 | 0.2374 | 0.8680 | 2.7890 | 0.3280 | 1.2393 | 2.5391 |
| −1 | 0.1957 | 0.8602 | 3.5348 | 0.3465 | 1.4911 | 2.8125 | 0.5756 | 2.3649 | 1.7434 |
| −1 | 0.2166 | 1.8590 | 6.7222 | 0.3367 | 2.8890 | 5.6921 | 0.4463 | 3.9055 | 4.8457 |
| −1 | 0.2352 | 0.2655 | 0.8635 | 0.3526 | 0.4008 | 0.7360 | 0.4930 | 0.5584 | 0.5742 |
| −1 | 0.1991 | 0.3051 | 1.2268 | 0.2869 | 0.4563 | 1.1340 | 0.3934 | 0.6407 | 0.9879 |
| −1 | 0.3036 | 1.4941 | 3.4272 | 0.4733 | 2.2828 | 2.5406 | 0.6016 | 2.9756 | 1.9705 |
| −1 | 0.3245 | 0.8070 | 1.6801 | 0.4840 | 1.1730 | 1.2506 | 0.6303 | 1.5315 | 0.8983 |
| −1 | 0.2551 | 0.8932 | 2.6082 | 0.4155 | 1.4230 | 2.0015 | 0.6151 | 2.0447 | 1.2792 |
| −1 | 0.1617 | 0.7205 | 3.7341 | 0.2522 | 1.1566 | 3.4293 | 0.3754 | 1.7507 | 2.9126 |
| −1 | 0.2269 | 2.8057 | 9.5576 | 0.3459 | 4.2550 | 8.0468 | 0.4732 | 5.8798 | 6.5464 |
| −1 | 0.2801 | 0.0594 | 0.1527 | 0.3907 | 0.0833 | 0.1299 | 0.5115 | 0.1092 | 0.1043 |
| 1 | 0.8684 | 0.5964 | 0.0904 | 0.9286 | 0.6433 | 0.0495 | 0.9534 | 0.6386 | 0.0312 |
| 1 | 0.9067 | 0.6051 | 0.0623 | 0.9425 | 0.6334 | 0.0387 | 0.9545 | 0.6245 | 0.0298 |
| 1 | 0.8646 | 0.9494 | 0.1487 | 0.9000 | 0.9614 | 0.1068 | 0.9133 | 0.9191 | 0.0873 |
| 1 | 0.7971 | 0.5246 | 0.1335 | 0.8323 | 0.5491 | 0.1107 | 0.8505 | 0.5552 | 0.0976 |
| 1 | 0.8436 | 0.8036 | 0.1490 | 0.8761 | 0.8381 | 0.1185 | 0.8959 | 0.8378 | 0.0974 |
| 1 | 0.8774 | 0.9959 | 0.1391 | 0.9327 | 1.0620 | 0.0767 | 0.9595 | 1.0669 | 0.0451 |
| 1 | 0.8702 | 1.5127 | 0.2256 | 0.9100 | 1.5562 | 0.1540 | 0.9311 | 1.5500 | 0.1146 |
| 1 | 0.8635 | 0.9256 | 0.1463 | 0.8937 | 0.9565 | 0.1137 | 0.9071 | 0.9559 | 0.0979 |
| 1 | 0.7573 | 0.3962 | 0.1270 | 0.8504 | 0.4502 | 0.0792 | 0.8829 | 0.4692 | 0.0622 |
| 1 | 0.8776 | 0.3224 | 0.0450 | 0.9349 | 0.3484 | 0.0243 | 0.9539 | 0.3499 | 0.0169 |
| 1 | 0.8271 | 1.1283 | 0.2358 | 0.8671 | 1.1516 | 0.1765 | 0.8872 | 1.1279 | 0.1435 |
| 1 | 0.789 | 0.5321 | 0.1423 | 0.8441 | 0.5686 | 0.1050 | 0.8639 | 0.5670 | 0.0893 |
| 1 | 0.829 | 0.4714 | 0.0972 | 0.8843 | 0.5111 | 0.0669 | 0.9081 | 0.5220 | 0.0528 |
| 1 | 0.7964 | 0.7724 | 0.1974 | 0.8317 | 0.8014 | 0.1621 | 0.8451 | 0.8001 | 0.1467 |
| 1 | 0.8138 | 1.0169 | 0.2327 | 0.8923 | 1.0953 | 0.1322 | 0.9313 | 1.1332 | 0.0836 |

TABLE 3-continued

Training Data for Three BPF Pairs

| Known | 1st BPF Pair (2~5.5) + (5.5~9) Hz | | | 2nd BPF Pair (2.5~6) + (6~9.5) Hz | | | 3rd BPF Pair (3~6.5) + (6.5 + 10) Hz | | |
|---|---|---|---|---|---|---|---|---|---|
| LS | eRatio | $E_L$ | $E_H$ | eRatio | $E_L$ | $E_H$ | eRatio | $E_L$ | $E_H$ |
| −1 | 0.1323 | 1.0562 | 6.9282 | 0.2005 | 1.6771 | 6.6876 | 0.3410 | 2.7983 | 5.4068 |
| −1 | 0.1341 | 0.1930 | 1.2462 | 0.1934 | 0.2901 | 1.2099 | 0.2945 | 0.4477 | 1.0726 |
| −1 | 0.0969 | 0.4666 | 4.3480 | 0.1536 | 0.7755 | 4.2740 | 0.2652 | 1.3470 | 3.7315 |
| −1 | 0.165 | 1.0152 | 5.1389 | 0.2302 | 1.4775 | 4.9418 | 0.3303 | 2.1534 | 4.3653 |
| −1 | 0.1491 | 0.4239 | 2.4198 | 0.2014 | 0.6012 | 2.3838 | 0.2922 | 0.8909 | 2.1586 |
| −1 | 0.1108 | 0.3769 | 3.0258 | 0.1700 | 0.6062 | 2.9608 | 0.2790 | 1.0039 | 2.5938 |
| −1 | 0.103 | 0.7284 | 6.3433 | 0.1393 | 1.0309 | 6.3677 | 0.2096 | 1.6090 | 6.0692 |
| −1 | 0.215 | 0.7899 | 2.8840 | 0.2960 | 1.1277 | 2.6828 | 0.4345 | 1.6112 | 2.0973 |
| −1 | 0.184 | 0.6384 | 2.8317 | 0.2500 | 0.9085 | 2.7259 | 0.3516 | 1.3108 | 2.4178 |
| −1 | 0.1352 | 0.1593 | 1.0190 | 0.1930 | 0.2420 | 1.0121 | 0.3060 | 0.3845 | 0.8719 |
| −1 | 0.1458 | 0.3729 | 2.1841 | 0.2127 | 0.5712 | 2.1146 | 0.3030 | 0.8456 | 1.9452 |
| −1 | 0.1248 | 0.8750 | 6.1380 | 0.2038 | 1.4901 | 5.8218 | 0.3715 | 2.6183 | 4.4290 |
| −1 | 0.1817 | 0.1689 | 0.7604 | 0.2556 | 0.2468 | 0.7186 | 0.3704 | 0.3599 | 0.6117 |

APPENDIX C

TABLE 4

Training Results

| known | using eRatio | using eRatio and $E_L$ of the single BPF pair | | using eRatio and $E_L$ of the 3 BPF pairs |
|---|---|---|---|---|
| LS | R' (i) | $S_{MSE}(i)$ | $S_{SVM}(i)$ | $S_{SVM}(i)$ |
| 1 | 0.4994 | 0.7538 | 1.4708 | 1.6343 |
| 1 | 0.6646 | 0.8741 | 1.6698 | 2.2164 |
| 1 | 0.6584 | 0.5922 | 1.0171 | 2.3132 |
| 1 | 0.8130 | 0.8741 | 1.5970 | 2.8485 |
| 1 | 0.8312 | 1.2438 | 2.4477 | 2.6845 |
| 1 | 0.6962 | 0.8176 | 1.5229 | 2.3305 |
| 1 | 0.8418 | 1.1675 | 2.2652 | 2.7910 |
| 1 | 0.8550 | 1.0257 | 1.9290 | 2.9578 |
| 1 | 0.7032 | 1.0923 | 2.1582 | 2.3069 |
| 1 | 0.6890 | 0.8408 | 1.5802 | 2.6616 |
| 1 | 0.8652 | 1.1831 | 2.2898 | 2.8667 |
| 1 | 0.6800 | 1.0238 | 2.0102 | 2.2116 |
| 1 | 0.9064 | 0.8358 | 1.4621 | 3.2540 |
| 1 | 0.7176 | 0.9662 | 1.8579 | 2.4698 |
| −1 | 0 | −0.6061 | −1.4470 | −2.1664 |
| −1 | −0.2598 | −0.6113 | −1.3318 | −2.2179 |
| −1 | −0.2970 | −0.4843 | −1.0182 | −1.1558 |
| −1 | −0.5208 | −0.8507 | −1.7605 | −2.2901 |
| 1 | 0.4132 | 0.6769 | 1.3341 | 1.3727 |
| 1 | 0.3338 | 0.5739 | 1.1337 | 1.0737 |
| 1 | 0.5646 | 0.8974 | 1.7728 | 1.8347 |
| 1 | 0.5036 | 0.8068 | 1.5920 | 1.6221 |
| 1 | 0.7396 | 1.1393 | 2.2497 | 2.3883 |
| 1 | 0.3088 | 0.5336 | 1.0521 | 1.0411 |
| 1 | 0.6048 | 0.9629 | 1.9055 | 1.9526 |
| 1 | 0.3816 | 0.6382 | 1.2597 | 1.2498 |
| 1 | 0.7480 | 1.1680 | 2.3123 | 2.4163 |
| 1 | 0.7964 | 1.0918 | 2.1114 | 2.7919 |
| 1 | 0.5280 | 0.8659 | 1.7174 | 1.6980 |
| 1 | 0.3904 | 0.6532 | 1.2902 | 1.2994 |
| 1 | 0.7732 | 1.2429 | 2.4740 | 2.4864 |
| −1 | −0.5306 | −0.8886 | −1.8440 | −2.4780 |
| −1 | −0.6806 | −1.0527 | −2.1521 | −2.5884 |
| −1 | −0.6086 | −0.9818 | −2.0224 | −3.2134 |
| −1 | −0.5668 | −1.0606 | −2.2263 | −3.7976 |
| −1 | −0.5296 | −0.7710 | −1.5710 | −1.5510 |
| −1 | −0.6018 | −0.8906 | −1.8137 | −1.9054 |
| −1 | −0.3928 | −0.7334 | −1.5506 | −2.4400 |
| −1 | −0.3510 | −0.5679 | −1.1862 | −1.4167 |
| −1 | −0.4898 | −0.7992 | −1.6562 | −2.3673 |
| −1 | −0.6766 | −1.0687 | −2.1913 | −2.9910 |
| −1 | −0.5462 | −1.1654 | −2.4800 | −4.9853 |
| −1 | −0.4398 | −0.5996 | −1.2163 | −1.0113 |
| 1 | 0.7368 | 1.1777 | 2.3403 | 2.4001 |

TABLE 4-continued

Training Results

| known | using eRatio | using eRatio and $E_L$ of the single BPF pair | | using eRatio and $E_L$ of the 3 BPF pairs |
|---|---|---|---|---|
| LS | R' (i) | $S_{MSE}$(i) | $S_{SVM}$(i) | $S_{SVM}$(i) |
| 1 | 0.8134 | 1.2972 | 2.5807 | 2.5924 |
| 1 | 0.7292 | 1.1146 | 2.1972 | 2.4549 |
| 1 | 0.5942 | 0.9633 | 1.9115 | 1.9163 |
| 1 | 0.6872 | 1.0695 | 2.1129 | 2.2193 |
| 1 | 0.7548 | 1.1482 | 2.2629 | 2.4572 |
| 1 | 0.7404 | 1.0506 | 2.0429 | 2.4871 |
| 1 | 0.7270 | 1.1146 | 2.1982 | 2.3505 |
| 1 | 0.5146 | 0.8564 | 1.7020 | 1.7575 |
| 1 | 0.7552 | 1.2464 | 2.4911 | 2.4273 |
| 1 | 0.6542 | 0.9704 | 1.8987 | 2.2302 |
| 1 | 0.5780 | 0.9367 | 1.8576 | 1.9146 |
| 1 | 0.6580 | 1.0716 | 2.1321 | 2.1248 |
| 1 | 0.5928 | 0.9252 | 1.8236 | 1.9478 |
| 1 | 0.6276 | 0.9446 | 1.8517 | 2.0843 |
| −1 | −0.7354 | −1.2101 | −2.4913 | −4.1321 |
| −1 | −0.7318 | −1.0793 | −2.1889 | −2.2726 |
| −1 | −0.8062 | −1.2363 | −2.5175 | −3.3021 |
| −1 | −0.6700 | −1.1010 | −2.2697 | −3.1509 |
| −1 | −0.7018 | −1.0655 | −2.1714 | −2.4599 |
| −1 | −0.7784 | −1.1794 | −2.3989 | −2.8846 |
| −1 | −0.7940 | −1.2550 | −2.5669 | −3.2994 |
| −1 | −0.5700 | −0.9107 | −1.8761 | −2.4032 |
| −1 | −0.6320 | −0.9865 | −2.0220 | −2.4605 |
| −1 | −0.7296 | −1.0710 | −2.1705 | −2.2300 |
| −1 | −0.7084 | −1.0685 | −2.1752 | −2.4564 |
| −1 | −0.7504 | −1.2075 | −2.4779 | −4.1647 |
| −1 | −0.6366 | −0.9257 | −1.8784 | −1.8651 |
| weights w | −1, 2 | −1.474, 3.153, −0.145 | −2.976, 6.353, −0.337 | −2.942, 3.433, 1.439, 2.098, 0.063, 0.407, −1.369 |

The invention claimed is:

1. A method at a computing device, the method comprising:
    deriving weighting constants for a type of chassis of a vehicle;
    obtaining sensor data for the vehicle providing vibration frequency and magnitude;
    calculating an energy for each of a low frequency passband and a high frequency passband of a bandpass filter pair;
    finding an energy ratio based on the energy for the low frequency passband and the energy for the high frequency passband, wherein the energy ratio comprises:

$$eRatio = \frac{E_L}{E_L + E_H}$$

where eRatio is the energy ratio; $E_L$ is the energy for the low frequency passband; and $E_H$ is the energy for the high frequency passband;
    applying the weighting constants to each of the energy for the low frequency passband, the energy for the high frequency passband and the energy ratio to calculate a decision variable; and
    finding that the vehicle is unloaded if the decision variable is below a threshold and finding that the vehicle is loaded if the decision variable is above a threshold.

2. The method of claim 1, further comprising repeating the calculating, finding and applying for a plurality of bandpass filter pairs.

3. The method of claim 1, wherein the deriving comprising applying a machine learning algorithm a plurality of known energies each of the low frequency passband and the high frequency passband pairs and energy ratios, along with a known loading status.

4. The method of claim 3, wherein the machine learning algorithm is a minimum-mean squared error algorithm.

5. The method of claim 4, wherein each of the plurality of known energies of the low frequency passband and the high frequency passband pairs and the energy ratio, along with the known loading status are represented as $$y_n = w_0 + w_1 x_{n1} + w_2 x_{n2} + \ldots + w_j x_{nj}$$

and wherein the plurality of equations may be solved for:

$$y = Xw$$

where $$X = \begin{bmatrix} 1 & \ldots & x_{1j} \\ \vdots & \ddots & \vdots \\ 1 & \ldots & x_{nj} \end{bmatrix}$$

and $$y = [y_1 y_2 \ldots y_n]^T$$

and $$w = [w_1 w_2 \ldots w_j]^T.$$

6. The method of claim 3, wherein the machine learning algorithm is a support-vector machine algorithm.

7. The method of claim 1, wherein the computing device is a sensor apparatus on the vehicle.

8. The method of claim 1, wherein the computing device is a server remote from the vehicle.

9. A computing device comprising:
a processor; and
a communications subsystem,
wherein the computing device is configured to:
derive weighting constants for a type of chassis of a vehicle;
obtain sensor data for the vehicle providing vibration frequency and magnitude;
calculate an energy for each of a low frequency passband and a high frequency passband of a bandpass filter pair;
find an energy ratio based on the energy for the low frequency passband and the energy for the high frequency passband, wherein the energy ratio comprises:

$$eRatio = \frac{E_L}{E_L + E_H}$$

where eRatio is the energy ratio; $E_L$ is the energy for the low frequency passband; and $E_H$ is the energy for the high frequency passband;
apply the weighting constants to each of the energy for the low frequency passband, the energy for the high frequency passband and the energy ratio to calculate a decision variable; and
find that the vehicle is unloaded if the decision variable is below a threshold and finding that the vehicle is loaded if the decision variable is above a threshold.

10. The computing device of claim 9, wherein the computing device is further configured to repeat the calculating, finding and applying for a plurality of bandpass filter pairs.

11. The computing device of claim 9, wherein the computing device is configured to derive by applying a machine learning algorithm a plurality of known energies each of the low frequency passband and the high frequency passband pairs and the energy ratio, along with a known loading status.

12. The computing device of claim 11, wherein the machine learning algorithm is a minimum-mean squared error algorithm.

13. The computing device of claim 12, wherein each of the plurality of known energies of the low frequency passband and the high frequency passband pairs and the energy ratio, along with the known loading status are represented as $$y_n = w_0 + w_1 x_{n1} + w_2 x_{n2} + \ldots + w_j x_{nj}$$

and wherein the plurality of equations may be solved for:

$$y = Xw$$

where $$X = \begin{bmatrix} 1 & \ldots & x_{1j} \\ \vdots & \ddots & \vdots \\ 1 & \ldots & x_{nj} \end{bmatrix}$$

and $$y = [y_1 y_2 \ldots y_n]^T$$

and $$w = [w_1 w_2 \ldots w_j]^T.$$

14. The computing device of claim 11, wherein the machine learning algorithm is a support-vector machine algorithm.

15. The computing device of claim 9, wherein the computing device is a sensor apparatus on the vehicle.

16. The computing device of claim 9, wherein the computing device is a server remote from the vehicle.

17. A non-transitory computer readable medium for storing instruction code, which, when executed by a processor on a computing device cause the computing device to:
derive weighting constants for a type of chassis of a vehicle;
obtain sensor data for the vehicle providing vibration frequency and magnitude;
calculate an energy for each of a low frequency passband and a high frequency passband of a bandpass filter pair;
find an energy ratio based on the energy for the low frequency passband and the energy for the high frequency passband, wherein the energy ratio comprises:

$$eRatio = \frac{E_L}{E_L + E_H}$$

where eRatio is the energy ratio; $E_L$ is the energy for the low frequency passband; and $E_H$ is the energy for the high frequency passband;
apply the weighting constants to each of the energy for the low frequency passband, the energy for the high frequency passband and the energy ratio to calculate a decision variable; and
find that the vehicle is unloaded if the decision variable is below a threshold and finding that the vehicle is loaded if the decision variable is above a threshold.

* * * * *